United States Patent
Hug

(10) Patent No.: US 11,489,363 B2
(45) Date of Patent: Nov. 1, 2022

(54) SYSTEM AND METHOD FOR BLACK STARTING POWER PLANT

(71) Applicant: General Electric Company, Schenectady, NY (US)

(72) Inventor: Roland Hug, Altendorf (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/184,474

(22) Filed: Feb. 24, 2021

(65) Prior Publication Data
US 2022/0271563 A1 Aug. 25, 2022

(51) Int. Cl.
| H02J 11/00 | (2006.01) |
| F01K 13/02 | (2006.01) |
| H02J 3/32  | (2006.01) |
| H02J 3/38  | (2006.01) |
| F02C 6/14  | (2006.01) |

(52) U.S. Cl.
CPC .............. *H02J 11/00* (2013.01); *F01K 13/02* (2013.01); *F02C 6/14* (2013.01); *H02J 3/32* (2013.01); *H02J 3/381* (2013.01)

(58) Field of Classification Search
CPC ................................................ F01K 13/00–02
See application file for complete search history.

(56) References Cited

U.S. PATENT DOCUMENTS

| 2004/0245783 | A1* | 12/2004 | Gilbreth .............. H02J 1/10 290/52 |
| 2009/0112374 | A1  | 4/2009  | Kirchhof et al. |
| 2013/0221877 | A1  | 8/2013  | Marken |
| 2018/0145511 | A1  | 5/2018  | Biellmann |
| 2018/0248378 | A1* | 8/2018  | Ren .............. H02M 7/537 |
| 2018/0248379 | A1* | 8/2018  | Schulz .............. H02J 13/0096 |

FOREIGN PATENT DOCUMENTS

| CN | 107528346 A     | * 12/2017 | .............. H02J 3/28 |
| CN | 109713669 A     | 5/2019    |                         |
| EP | 2645522 A1      | 10/2013   |                         |
| EP | 3952047 A1      | * 2/2022  | .............. H02J 3/32 |
| WO | WO-2021034326 A1| * 2/2021  | .............. H02J 3/32 |
| WO | WO-2021196406 A1| * 10/2021 | .............. H02J 3/32 |

OTHER PUBLICATIONS https://www.ge.com/news/press-releases/hybrid-solutions-ge-completes-first-battery-assisted-black-start-ge-heavy-duty-gas, Feb. 26, 2020, 3 pgs.

(Continued)

*Primary Examiner* — Laert Dounis
(74) *Attorney, Agent, or Firm* — Fletcher Yoder, P.C.

(57) ABSTRACT

An auxiliary power source is configured to black start a power plant. The auxiliary power source includes a first power source having an auxiliary generator driven by an auxiliary drive. The auxiliary power source also includes a second power source having energy storage. The auxiliary power source is configured to supply power from the first and second power sources to support the black start of the power plant.

20 Claims, 11 Drawing Sheets

(56) References Cited

OTHER PUBLICATIONS

Mr. Fuchs: "Battery Energy Storage Solution Enhancing the operational flexibility of flexible combined cycle industrial gas turbines", May 9, 2018, XP002796579, pp. 1-4 http://hybridpowersystems.org/wp-content/uploads/sites/9/2018/05/3a_2_TENE18_paper_Fuchs_Uwe.pdf.
Wemag: "Erfolgreicher Schwarzstart", May 17, 2019, pp. 1-3, XP002796622 https://www.stadt-und-werk.de/meldung_31585_Erfolgreicher+Schwarzstart.pdf.
Liu Weijia et al: Multi-objective restoration optimisation of power systems with battery energy storage systems:, IET Generation, Transmission&Distribution, IET, UK, vol. 10, No. 7, May 5, 2016 (May 5, 2016), pp. 1749-1757, XP006056487.
European Extended Search Report for EP Application No. 22156181 4 dated Jul. 22, 2022; 9 pgs.

\* cited by examiner

US 11,489,363 B2

SYSTEM AND METHOD FOR BLACK STARTING POWER PLANT

BACKGROUND

The subject matter disclosed herein relates to power plants.

Power grids carry electrical energy from power plants to various customers. A device that uses electrical energy is referred to as a load. A power plant may also be considered a load when it uses electrical power to start power production that is commonly known as auxiliary loads.

Unfortunately, power outages may occur due to faulty equipment, weather, technical issues and accidents. These power outages may vary in scale. In some cases, the power outage may be large and may inhibit a power plant from restarting operation by drawing power from the power grid. In this situation, the power plants may be required to start with local or temporarily available power sources either installed in the same power plant or elsewhere. This kind of restart is commonly referred to as a black start. A black start is the process of starting a power station from power sources other than power grid and of restoring sections of a power grid after a partial or complete blackout. Restoring sections of the power grid after a blackout involves significant amounts of power, as multiple loads draw power simultaneously. For example, simultaneous energization of a power grid section may include industrial, office, and/or household loads. However, dynamically changing power production by a power plant in response to a power grid restoration stages may wear equipment, and/or it may trip the power plant (i.e., take it offline) because of excessive power draw beyond capabilities of the power plant.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject power grid restoration system. Indeed, the present system may encompass a variety of forms that may be similar to or different from the embodiments set forth below.

In certain embodiments, an auxiliary power source is configured to black start a power plant. The auxiliary power source includes a first power source having an auxiliary generator driven by an auxiliary drive. The auxiliary power source also includes a second power source having energy storage. The auxiliary power source is configured to supply power from the first and second power sources to support the black start of the power plant.

In certain embodiments, a system includes a controller configured to control a black start of a power plant using power from first and second power sources of an auxiliary power source. The auxiliary power source includes a first power source having an auxiliary generator driven by an auxiliary drive, and a second power source having energy storage.

In certain embodiments, a method includes controlling a black start of a power plant using power from first and second power sources of an auxiliary power source. The auxiliary power source includes a first power source having an auxiliary generator driven by an auxiliary drive, and a second power source having energy storage.

BRIEF DESCRIPTION OF THE DRAWINGS

These and other features, aspects, and advantages of the present power grid restoration system and methods of restoring power during a black grid event will become better understood when the following detailed description is read with reference to the accompanying drawings in which like characters represent like parts throughout the drawings, wherein.

DETAILED DESCRIPTION

Figure 1:
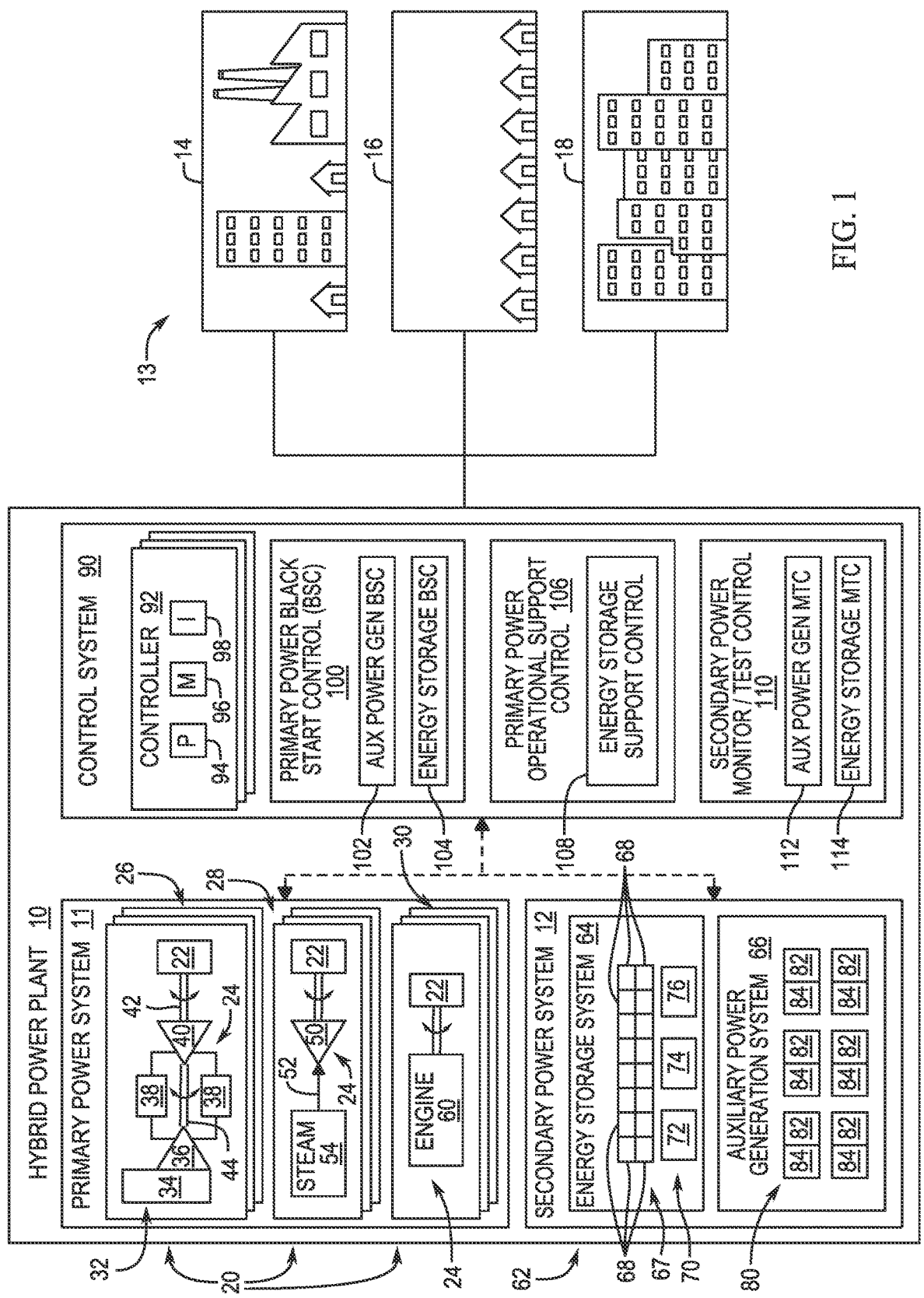
FIG. 1 is a schematic of an embodiment of a hybrid power plant having a primary power plant and a secondary power system, including an energy storage system and an auxiliary power generation system.

One or more specific embodiments of the present power grid restoration system will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present system, the articles "a," "an," "the," and "said" are intended to mean that there are one or more of the elements. The terms "comprising," "including," and "having" are intended to be inclusive and mean that there may be additional elements other than the listed elements.

As explained above, power grids may experience significant power outages also called blackouts. If a power plant is shut down during a power outage, then the power plant may undergo a black start using a secondary power system (e.g., an auxiliary power source). The embodiments described herein include a hybrid power plant that enables black starting via an auxiliary power source, which includes a plurality of different types of power sources, such as an energy storage system (e.g., chemical energy storage such as batteries) and an auxiliary power generation system (e.g., auxiliary generators driven by auxiliary drives, such as reciprocating engines). The combination of different types of power sources (e.g., energy storage system and auxiliary power generation system) for the auxiliary power source helps to reduce costs, while adding various advantages to the power plant. For example, the auxiliary power generation system may be configured to charge the energy storage system at various times, such as prior to the black start of the power plant, after an unsuccessful attempt at the black start, between black starts of a plurality of power generation systems (e.g., gas turbine driven generators), or any combination thereof. Additionally, in certain embodiments of the auxiliary power source, each of the different types of power sources may be downsized to a power capacity less than is needed for the black start, yet the combined power capacity of the multiple power sources is equal to or greater than is needed for the black start. After a successful black start of the power plant, the auxiliary power source can also help with restoring the power grid, stabilizing the power grid, or other support functions.

Power is restored to the power grid after a blackout, in limited steps in order to stabilize the power grid as power production increases by one or more power plants. For example, one neighborhood may have power restored, followed by another neighborhood, a factory, a city block, and so on. Restoring power to these various sections of the power grid are referred to as load steps, because as each section is energized the simultaneous draw of power from the section creates a step change in the load or power use. For example, the load (i.e., the combined load of various electrical devices) from a first section of the power grid may draw 25 MW. As soon as a second section of the power grid is energized, the combined power draw may jump from 25 MW to 45 MW or any other value demanded by the power grid and sized for the solution capacity.

The embodiments described herein include a hybrid power plant that enables black grid restoration of a power grid with large load steps. As a result of the large load steps, the power grid may be restored more rapidly and without dynamically out-of-normal operation loading the power plant portion of the hybrid power plant. In other words, in response to energizing sections of the power grid, the power plant may not rapidly increase power output beyond the normal operational limits. This measured approach reduces stress and lifetime consumption on components of the power plant, such as its gas turbines.

FIG. 1 is a schematic of an embodiment of a hybrid power plant 10 having a primary power plant or system 11 (e.g., a primary power generation system) and a secondary power system 12 (e.g., an auxiliary power source). The hybrid power plant 10 is coupled to various sections of a power grid 13, such as power grid sections 14, 16, and 18. The primary power plant 11 is configured to provide power to the power grid 13 under normal circumstances. The secondary power system 12 is configured to supplement and/or support the primary power plant 11 under certain transient conditions, such as a black start, support in response to sudden changes in load on the primary power plant 11, and/or support to help stabilize the frequency of the power. For example, if there is an imbalance of power on the power grid 13 (e.g., power generation is less than consumption, causing a decrease in frequency on the power grid), then the secondary power system 12 can help to cover the gap by providing more power to the power grid 13. Similarly, at the hybrid power plant 10, if the power production drops (e.g., low frequency of a turbine), then the secondary power system 12 can help to cover the gap by providing more power. As discussed in detail below, the disclosed embodiments may use a combination of multiple types of secondary power (i.e., auxiliary power types) in the secondary power system 12 to help support the primary power plant 11.

The primary power plant 11 may include a plurality of power generation systems 20, each having an electrical generator 22 driven by a power drive 24, such as a gas turbine engine 32, a steam turbine 50, or a reciprocating engine 60 as discussed in further detail below. In the illustrated embodiment, the power generation systems 20 may include one or more gas turbine generator systems 26, one or more steam turbine generator systems 28, and/or one or more reciprocating engine generator systems 30.

Each gas turbine generator system 26 has the generator 22 driven by a gas turbine engine 32, which includes an air intake 34, a compressor 36, one or more combustors 38, and a turbine 40. In operation, the air intake 34 (e.g., air intake duct) receives ambient air, filters the ambient air through one or more filters, silences noise via one or more silencer baffles, and controls a temperature of the air via a thermal control system (e.g., heat exchanger, heated fluid injection, etc.). The compressor 36 receives the air from the air intake 34, compresses the air in one or more compression stages (e.g., stages of rotating compressor blades), and supplies the compressed air to the one or more combustors 38. The combustors 38 mix the compressed air with fuel supplied through one or more fuel nozzles, and combust the fuel-air mixture to generate hot combustion gases, which then flow into the turbine 40. The turbine 40 includes one or more turbine stages (e.g., stages of rotating turbine blades), which are driven to rotate by the hot combustion gases. As the turbine 40 rotates, the turbine 40 drives one or more shafts 42, 44 rotatably coupling together the turbine 40, the compressor 36, and the generator 22, thereby enabling the turbine 40 to drive rotation of the compressor 36 and the generator 22.

In certain embodiments, the gas turbine engine 32 may be an industrial gas turbine engine (e.g., H-class, F-class, B-class, or E-class gas turbine engine produced by General Electric Company of Schenectady, NY) or an aeroderivative gas turbine engine (e.g., LMS100, LM9000, LM6000, LM2500, or TM2500 gas turbine engine produced by General Electric Company of Schenectady, NY). Each gas turbine generator system 26 may be configured to produce between 20 and 600 MW of electricity, such as at least equal to or greater than 20, 30, 40, 50, 75, 100, 200, 300, 400, or 500 MW of electricity.

Each steam turbine generator system 28 has the generator 22 driven by a steam turbine 50, which receives steam 52 from a steam source 54. The steam source 54 may include a boiler, a steam generator, or a heat recovery steam generator (HRSG). For example, in a combined cycle power plant 10, the steam source 54 may be a HRSG that uses the exhaust gas from the gas turbine engine 32 to generate steam for the steam turbine 50. The steam turbine generator system 28 may be an industrial steam turbine (e.g., STF-D series or STF-A series steam turbine produced by General Electric Company of Schenectady, NY). Each steam turbine generator system 28 may be configured to produce between 100 and 1200 MW of electricity, such as at least equal to or greater than 50, 100, 200, 300, 400, 500, 600, 700, 800, 900, 1000, 1100, or 1200 MW of electricity.

Each reciprocating engine generator system 30 has the generator 22 driven by a reciprocating engine 60, which combusts fuel with air to drive one or more pistons in respective cylinders. The fuel may include gasoline, diesel fuel, natural gas, biogas, coal mine gas, propane, sewage gas, landfill gas, or another suitable fuel type. Accordingly, the reciprocating engines 60 may be described as piston-cylinder engines, diesel engines, gasoline engines, or gas engines. The reciprocating engine 60 may include any number of piston-cylinder assemblies, such as any number from 1 to 30 piston-cylinder assemblies. The reciprocating engine 60 may operate at a speed between approximately 1000 and 2000 rpm (e.g., 1500 rpm), and produce power between approximately 200 kW to 15 MW.

The secondary power system 12 (e.g., auxiliary power source) includes a plurality of different types of power sources 62 (e.g., 1 to 10 or more), such as an energy storage system (ESS) 64 and an auxiliary power generation system 66. The energy storage system may include energy storage 67, including one or more of: radiation energy storage, chemical energy storage, mechanical energy storage, electrical potential energy storage, thermal energy storage, or any combination thereof. For example, the energy storage system 64 may include energy storage 67 having a plurality of energy storage units 68, which may store energy in one, multiple, or all of the foregoing forms of energy storage. In certain embodiments, the energy storage units 68 (e.g., chemical energy storage units) may include one or more types of chemical energy storage, such as batteries or fuel cells. Additionally, each of the energy storage units 68 may include one or more batteries, electrochemical cells, modules, or containers housing chemicals. In certain embodiments, the energy storage units 68 may include one or more types of rechargeable batteries, such as lead-acid (LA) batteries, nickel-cadmium (NiCd) batteries, nickel-zinc (NiZn) batteries, nickel metal hydride (NiMH) batteries, and/or lithium-ion (Li-ion) batteries. By further example, the energy storage units 68 may include fuel cells configured to convert chemical energy of a fuel (e.g., hydrogen) and an oxidizing agent (e.g., oxygen) into electricity.

In some embodiments, the energy storage units 68 may include mechanical energy storage, such as kinetic energy storage, gravitational potential energy storage, and/or compressed gas (e.g., air) storage. The kinetic energy storage may include a flywheel energy storage (FES) using one or more flywheels. Each flywheel rotates and thus stores kinetic energy due to its rotational motion. The gravitational potential energy storage may store gravitational energy by positioning solid masses (e.g., concrete blocks) at elevated locations, such that the solid masses can be released or dropped to drive a generator (e.g., electric motor/generator). When excess electricity is available, the solid masses may be raised to the elevated locations using an elevating system (e.g., a crane or lift driven by the electric/motor generator).

The compressed gas storage may store a compressed gas (e.g., air, nitrogen, carbon dioxide, etc.) in a pressure vessel or tank, and then later use the compressed gas as a source of energy to power a motor or drive 24 (e.g., a turbine or a reciprocating engine). In the hybrid power plant 10, the flywheel energy storage may be coupled to one of the drives 24 via a clutch. Additionally, the compressed gas storage may store a compressed air, steam, or an exhaust gas from one of the drives 24 (e.g., gas turbine engine 32, steam turbine 50, or reciprocating engine 60). In certain embodiments, the compressed gas storage may store a compressed inert gas (e.g., nitrogen) generated in the hybrid power plant 10 via an air separation unit (ASU).

Additionally, the energy storage units 68 may include thermal energy storage (TES), such as thermal energy stored in a fluid or solid medium. The stored thermal energy may include elevated temperatures (e.g., hot fluid or solid media) or lowered temperatures (e.g., cold fluid or solid media, such as cryogenic thermal energy storage). Examples of TES media include molten salt energy storage (MSES), an insulated tank storing a heated fluid (e.g., water, steam), a solid or molten silicon energy storage, a molten metal (e.g., aluminum) energy storage, a phase-change material (PCM) energy storage, a thermo-chemical heat storage using an exothermic/endothermic chemical reaction, a solar energy storage (e.g., storing solar heat), or any combination thereof. One or more of these media may be used to store heat generated by one of the drives 24 (e.g., gas turbine engine 32, steam turbine 50, or reciprocating engine 60), for example. The stored thermal energy can be converted to electricity in one or more conversion systems, such as a turbine, a Rankine cycle, a Brayton cycle, etc.

The energy storage system 64 also may include various support systems 70, such as a thermal control system 72 configured to adjust (e.g., increase and/or decrease) a temperature of the energy storage units 68 to ensure reliability and suitable performance. The support systems 70 also may include a charging system 74 configured to provide power to the energy storage units 68 to maintain a sufficient charge, for example, by using power from the primary power plant 11 and/or the auxiliary power generation system 66. The support systems 70 also may include a monitoring system 76 configured to monitor various characteristics of the energy storage units 68, such that problems can be identified and corrected prior to a black start of the primary power plant 11. The monitoring system 76 may include voltage sensors, current sensors, temperature sensors, pressure sensors, leak sensors, smoke sensors, or any combination thereof.

The auxiliary power generation system 66 may include one or more auxiliary power generation units 80, each including an auxiliary generator 82 driven by an auxiliary drive 84. In certain embodiments, the auxiliary drives 84 include a reciprocating engine, which combusts fuel with air to drive one or more pistons in respective cylinders. The fuel may include gasoline, diesel fuel, natural gas, biogas, coal mine gas, propane, sewage gas, landfill gas, or another suitable fuel type. Accordingly, the reciprocating engine may be described as a piston-cylinder engine, a diesel engine, a gasoline engine, or a gas engine. The reciprocating engine may include any number of piston-cylinder assemblies, such as any number from 1 to 20 piston-cylinder assemblies. The reciprocating engine may operate at a speed between approximately 1000 and 2000 rpm (e.g., 1500 rpm), and produce power between approximately 50 kW to 5 MW or more.

Additionally, in some embodiments, the auxiliary drives 84 include a turbine, such as a gas turbine or a steam turbine.

In general, the auxiliary power generation units 80 may be sized substantially smaller (e.g., lower power capacity) than their counterparts in the primary power plant 11, because the auxiliary power generation units 80 are configured to provide support for the primary power plant 11.

In certain embodiments, the total power capacity of the secondary power system 12 may be approximately 1 to 10 percent of the total power capacity of the highest capacity power generation system 20. Alternatively or additionally, the total power capacity of the secondary power system 12 may be equal to or greater than 100 percent (e.g., 100 to 120 percent) of the total power requirement for black starting the power generation system 20 (e.g., the power generation system 20 with the highest black starting power requirement in the primary power plant 11).

The total power capacity of the secondary power system 12 may be split between the energy storage system 64 (percentage A) and the auxiliary power generation system 66 (percentage B) in a variety of proportions A:B, such as 10:90, 20:80, 30:70, 40:60, 50:50, 60:40, 70:30, 80:20, 90:10, or any ranges between these proportions. For example, the proportions A:B may range between approximately 10:90 to 90:10, 20:80 to 80:20, 30:70 to 70:30, or 40:60 to 60:40. In certain embodiments, the percentage A of the energy storage system 64 may be less than the percentage B of the auxiliary power generation system 66 by at least 1, 2, 3, 4, 5, 6, 7, 8, 9, or 10 percent, or vice versa. The percentages A and B also may be selected based on a baseline power requirement (e.g., minimum, steady, or lower threshold of power) and a transient power requirement (e.g., a peak power requirement) for black starting the power plant 11. For example, in certain embodiments, the energy storage system 64 is designed with a power capacity to handle the transient power requirement (e.g., peak power requirement), while the auxiliary power generation system 66 is designed with a power capacity to handle the baseline power requirement for black starting the power plant 11.

The hybrid power plant 10 may further include a control system 90 having one or more controllers 92 configured to control operation of the primary power plant 11, the secondary power system 12, and various support functions for the primary power plant 11 using power from the secondary power system 12. Each controller 92 includes one or more processors 94, memory 96, and instructions 98 configured to be stored on the memory 96 and executable by the processor 94 to perform control functions of the hybrid power plant 10. In certain embodiments, the controllers 92 may include a gas turbine controller for the gas turbine generator systems 26, a steam turbine controller for the steam turbine generator system 28, a reciprocating engine controller for the reciprocating engine generator system 30, and/or a primary power plant controller for the primary power plant 11. Additionally, the controllers 92 may include a controller for the energy storage system 64, a controller for the auxiliary power generation system 66, and/or a controller for the secondary power system 12.

For example, the instructions 98 and/or circuitry of the controller 92 may include a primary power black start control (BSC) 100 having an auxiliary power generation BSC 102 and an energy storage BSC 104, a primary power operational support control 106 having an energy storage support control 108, and a secondary power monitor/test control (MTC) 110 having an auxiliary power generation MTC 112 and an energy storage MTC 114.

The secondary power MTC 110 is configured monitor and test various operational parameters of the secondary power system 12 to identify potential problems, initiate corrective actions, and to ensure readiness for the black start. For example, the auxiliary power generation MTC 112 may be configured to monitor operational parameters (e.g., power output, emissions levels, vibration, knock in a reciprocating engine, temperature, pressure, etc.) of the auxiliary drive 84 and operational parameters (e.g., current, voltage, etc.) of the auxiliary generator 82 during normal operation and/or a dedicated test run of each auxiliary power generation unit 80.

Similarly, the energy storage MTC 114 may be configured to monitor and/or test parameters of the energy storage system 12, such as a power level (e.g., percent of full charge), condition of chemicals, ability to hold a charge, or any conditions indicating a need for maintenance or replacement. For example, the energy storage MTC 114 may perform a battery test, subject the energy storage units 68 to a test load and monitor conditions of the units 68 during the test load, or evaluate trends in performance of the energy storage units 68 over time.

In certain embodiments, the energy storage MTC 114 is configured to communicate with and control the thermal control system 72, the charging system 74, and the monitoring system 76. For example, the energy storage MTC 114 may receive sensor data from the monitoring system 76, temperature data from the thermal control system 72, and charging data from the charging system 74. The received data can then be used by the energy storage MTC 114 to help evaluate the health of the energy storage units 68. In certain embodiments, the MTC 114 may assign a health value based on the various data, such as a health value from 1 to 10 or 1 to 100. The controller 92 may be configured to analyze the data (e.g., sensor data, test data, and/or health value) from the energy storage MTC 114, and trigger appropriate control actions if needed. For example, the control actions may include alerts and alarms (e.g., audible and/or visual) to operators, recharging of the energy storage units 68 via the charging system 74, temperature adjustment of the energy storage units 68 via the thermal control system 72, scheduling of operator inspections and/or servicing, scheduling of repairs/replacements, or any combination thereof.

As discussed above, the primary power BSC 100 includes the auxiliary power generation BSC 102 and the energy storage BSC 104, which are configured to control the auxiliary power generation system 66 and the energy storage system 64, respectively, for black starting the primary power plant 11. For example, the primary power BSC 100 may be configured to control and coordinate the power output by each of the auxiliary power generation system 66 and the energy storage system 64 to meet the power requirement for black starting the primary power plant 11.

In certain embodiments, the primary power BSC 100 may be configured to evaluate feedback from the monitoring system 76 and/or the secondary power MTC 110 to evaluate a readiness (e.g., power level or percent charge) of the energy storage system 64 for the black start (i.e., a readiness check). If the monitoring system 76 and/or the secondary power MTC 110 indicates an insufficient power level (e.g., power below a threshold power level) of the energy storage system 64, then the primary power BSC 100 may be configured to control the charging system 74 to recharge the energy storage units 68 of the energy storage system 64 (i.e., recharging procedure). The foregoing readiness check and/or recharging procedure may be performed by the primary power BSC 100 of the controller 92 at regular intervals (e.g., daily, weekly, or monthly), prior to an attempt to black start the primary power plant 11, after an unsuccessful attempt to black start the primary power plant 11, and/or between black start procedures for different power generation systems 20 of the primary power plant 11.

During a black start procedure, the primary power BSC 100 may be configured to control the auxiliary power generation system 66 via the auxiliary power generation BSC 102 to provide a baseline power for the black start, e.g., a relatively steady power requirement for the black start of the primary power plant 11. Additionally, the primary power BSC 100 may be configured to control the energy storage system 64 via the energy storage BSC 104 to provide a supplemental power for the black start, e.g., additional power to cover any transient power requirements (e.g., spikes in power demand) for the black start of the primary power plant 11. In this manner, in certain embodiments, the auxiliary power generation system 66 may include a sufficient number and capacity of auxiliary power generation units 80 only for the baseline power requirements, but not for the transient power requirements. Instead, the energy storage system 64 covers the difference between the baseline power requirements and the transient power requirements. As a result, in certain embodiments, neither the auxiliary power generation system 66 alone nor the energy storage system 64 alone has sufficient power capacity to support the black start of the primary power plant 11, but the combination of both systems 64 and 66 provides sufficient power capacity to support the black start of the primary power plant 11.

However, in some embodiments, each of the auxiliary power generation system 66 and the energy storage system 64 is independently sized to handle the black start procedure. In some embodiments, the primary power plant 11 may include power generation systems 20 having different power requirements for a black start, e.g., a large industrial gas turbine generator system 26 may require substantially more power than a smaller gas turbine generator system 26 or a reciprocating engine generator system 30 during a black start procedure. Accordingly, the secondary power system 12 may be configured to support a black start of at least some of the power generation systems 20 using only the energy storage system 64 without the auxiliary power generation system 66, or using only the auxiliary power generation system 66 without the energy storage system 64.

After the black start of the primary power plant 11, the hybrid power plant 10 may be configured to restore power to the power grid 13. The electrical energy created by the generators 22 of the primary power plant 11 is transferred through transmission lines to sections (e.g., sections 14, 16, and 18) of the power grid 13. The power from the generators 22 may also be transferred to the energy storage system 64, which may be configured to store the electrical energy as chemical energy within the energy storage units 68 (e.g., banks of batteries). In certain embodiments, the energy in the energy storage system 64 may be released to the power grid 13, as needed to supplement power produced by the primary power plant 11. For example, the power from the energy storage system 64 may be released during times of peak electricity usage. Power from the energy storage system 64 may also be released to satisfy unexpected demand. Accordingly, the energy storage support control 108 of the primary power operational support control 106 may be configured to control release of power from the energy storage system 64 to supplement power produced by the primary power plant 11 (e.g., during peak demand), to help stabilize the frequency on the power grid 13, and to help address any other power deficiencies in the hybrid power plant 10 and/or in the power grid 13. In addition to supplementing the power produced by the primary power plant 11, the energy storage system 64 may be configured to help with black grid restoration.

As explained above, black grid restoration is the restoring of power to the power grid 13 after a blackout. Power is restored to the power grid 13 after a blackout, in measured steps to stabilize the power grid 13 as power production increases by one or more power plants. For example, one neighborhood may receive power, followed by another neighborhood, a factory, city block, and so on. Restoring power to these various sections of the power grid 13 is referred to as load steps because, as soon as a section of the power grid is energized, the simultaneous draw of power from electrical devices in that section creates a step change in power usage. For example, the load (i.e., the combined load of various electrical devices) from a first section of the power grid (e.g., section 14) may draw 25 MW. As soon as a second section of the power grid (e.g., section 16 or section 18) is energized, the combined power draw may jump from 25 MW to 45 MW or any other value demanded by the power grid and sized for the solution capacity as the electricity-using devices in the second section immediately begin using power.

The embodiments described herein may be configured to enable black grid restoration with large load step changes using the energy storage system 64. Therefore, the power grid 13 may be restored more rapidly and with flexible load steps. The hybrid power plants 10 described below may also reduce a dynamic response from the primary power plant 11 portion of the hybrid power plant 10. In other words, the primary power plant 11 may not be required to rapidly increase power output in response to energizing sections of the power grid 13. This may reduce stress and lifetime consumption on components of the primary power plant 11, such as its gas turbines.

Figure 2:
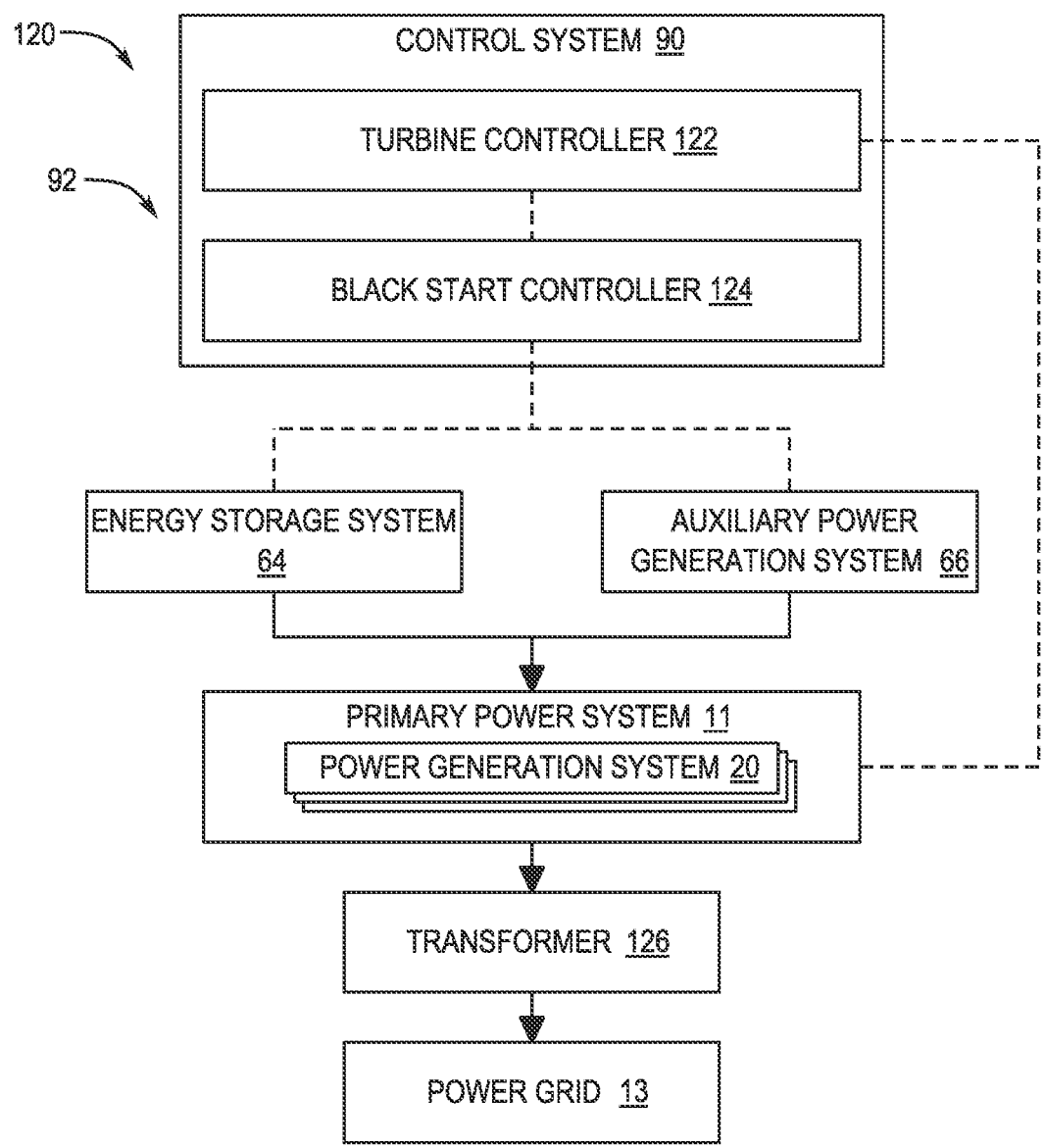
FIG. 2 is a schematic of an embodiment of the hybrid power plant of FIG. 1, illustrating details of a black start system using a combination of power from both the energy storage system and the auxiliary power generation system.

FIG. 2 is a schematic of an embodiment of the hybrid power plant 10 of FIG. 1, illustrating details of a black start system 120 using a combination of power from both the energy storage system 64 and the auxiliary power generation system 66 for black starting the primary power plant 11. As illustrated, the control system 90 includes a plurality of controllers 92 (e.g., a turbine controller 122 and a black start controller 124) configured to control the power generation system 20 (e.g., gas turbine generator system 26), the energy storage system 64, and the auxiliary power generation system 66. The controllers 122 and 124 are shown as separate controllers; however, the controllers 122 and 124 may be integrated into a single controller in certain embodiments. Additionally, the controllers 122 and 124, and the control system 90 as a whole, may include all of the features discussed above with reference to the control system 90 of FIG. 1.

In operation, the black start controller 124 may be configured to monitor and control operational parameters of the energy storage system 64 and the auxiliary power generation system 66 to provide sufficient power to the power generation system 20 (e.g., gas turbine generator system 26) for a black start, while also interacting with the turbine controller 122 to initiate the black start. If the black start is unsuccessful, then the black start controller 124 is configured to control the auxiliary power generation system 66 to recharge the energy storage system 64 before initiating another attempt to black start the power generation system 20 (e.g., gas turbine generator system 26). If the black start is successful, then the control system 90 may proceed to deliver the power from the primary power plant 11 through one or more transformers 126 to the power grid 13. In certain embodiments, the control system 90 is configured to use power from the energy storage system 64 to assist with restoration of power to the power grid 13, to help respond to transient conditions on the power grid 13, and/or to help respond to transient conditions in the primary power plant 11.

Advantageously, embodiments of the secondary power system 12 having both the auxiliary power generation system 66 and the energy storage system 64, rather than only the energy storage system 64, enables use of energy storage units 68 sized for one black start attempt rather than substantially oversized for multiple black start attempts (e.g., 2, 3, 4, or more black start attempts). In other words, the energy storage units 68 can be sized to supplement auxiliary power generation units 80 for a first black start attempt, and then the auxiliary power generation units 80 recharge the energy storage units 68 for each subsequent black start attempt. This combination of the auxiliary power generation system 66 and the energy storage system 64 provides benefits of both types of equipment (e.g., units 68 and 80), while reducing costs associated with oversizing the equipment.

Figure 3:
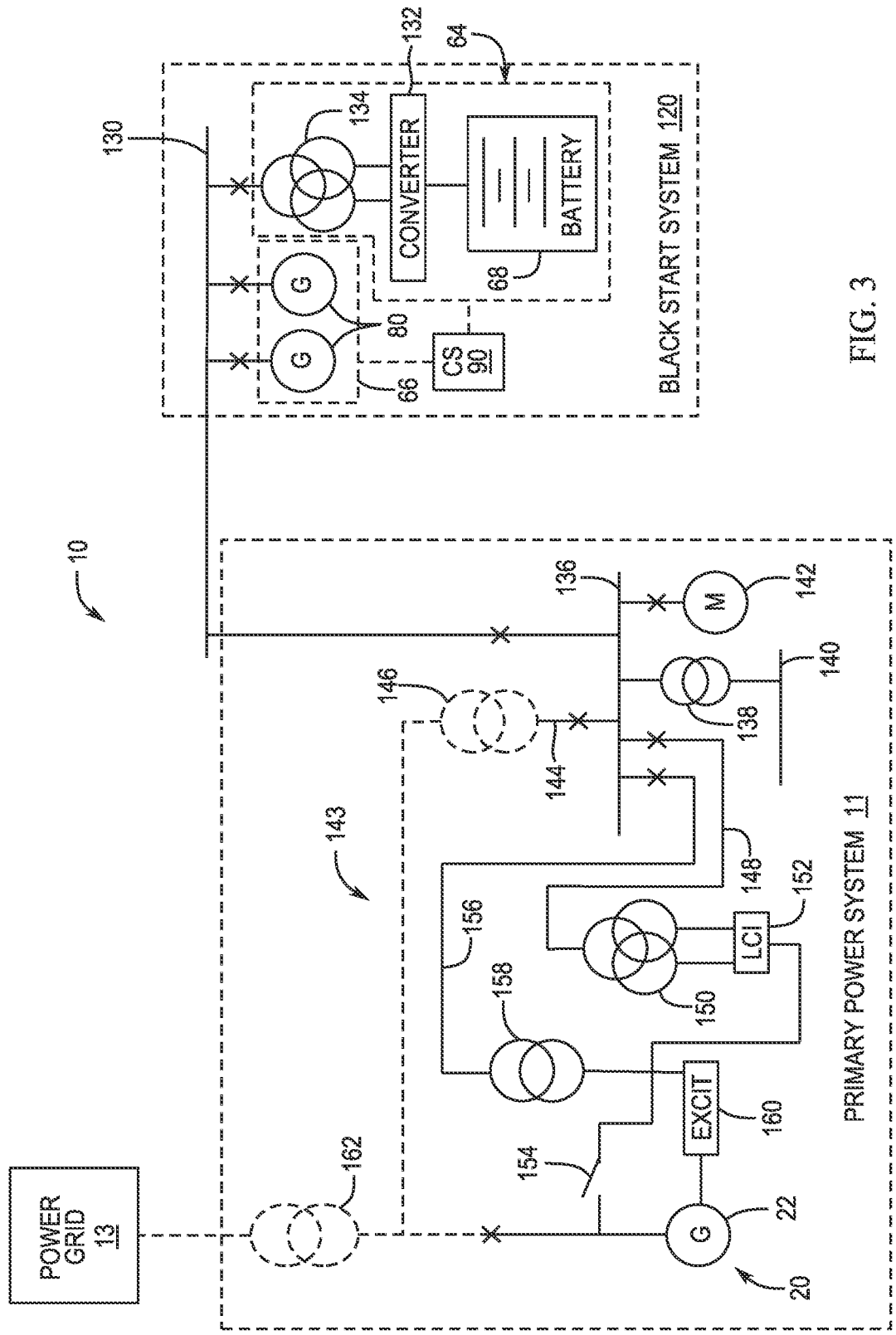
FIG. 3 is a schematic of an embodiment of the hybrid power plant of FIG. 1, illustrating details of a black start system using a combination of power from both the energy storage system and the auxiliary power generation system.

FIG. 3 is a schematic of an embodiment of the hybrid power plant 10 of FIG. 1, illustrating details of the black start system 120 using a combination of power from the energy storage system 64 and the auxiliary power generation system 66 for black starting the primary power plant 11. In the illustrated embodiment, the black start system 120 includes a plurality of the auxiliary power generation units 80 (e.g., diesel engine driven generators) of the auxiliary power generation system 66 and one or more energy storage units 68 (e.g., batteries) of the energy storage system 64 electrically coupled to a medium voltage (MV) supply circuit 130 (e.g., 3 to 24 kV supply circuit). The energy storage system 64 includes a converter 132, a transformer 134 (e.g., three winding transformer), and the one or more energy storage units 68 (e.g., batteries). The converter 132 and the transformer 134 are disposed between the one or more energy storage units 68 (e.g., batteries) and the circuit 130.

When the energy storage system 64 is operating in a power supply mode, the converter 132 is configured convert a direct current (DC) power from the one or more energy storage units 68 (e.g., batteries) to an alternating current (AC), and the transformer 134 is configured to provide the desired medium voltage power to the supply circuit 130. When the energy storage system 64 is operating in a charge (or recharge) mode, the transformer 134 is configured to adjust the power from the supply circuit 130 for use with the one or more energy storage units 68, and the converter 132 is configured convert the power from AC to DC for use in charging the one or more energy storage units 68 (e.g., batteries). The black start system 120 may include, or integrate with, the control system 90 as discussed above. Accordingly, the control system 90 and/or the black start system 120 may be configured to control the mode of operation (e.g., power supply mode or charge mode) of the energy storage system 64 and the auxiliary power generation system 66. In the charge mode, the auxiliary power generation system 66 and/or the primary power plant 11 may be used to charge the one or more energy storage units 68 of the energy storage system 64. In the power supply mode, the energy storage system 64 and the auxiliary power generation system 66 both may be used to supply energy for black starting the primary power plant 11.

During a black start, the black start system 120 is configured to supply the medium voltage power from the supply circuit 130 to a medium voltage (MV) power plant circuit 136 (e.g., 3 to 24 kV circuit) of the primary power plant 11. Additionally, the primary power plant 11 may include a transformer 138 (e.g., two winding transformer) between the medium voltage power plant circuit 136 and a low voltage (LV) power plant circuit 140 (e.g., 0.1 to 1 kV circuit) of the primary power plant 11. The transformer 138 is configured to provide the power from the plant circuit 136 to the plant circuit 140 at the proper low voltage. Each of the plant circuits 136 and 140 is configured to power various equipment associated with the black start of the primary power plant 11. For example, the plant circuit 140 may be used for various monitoring systems, control systems, data communications, or other equipment. By further example, the plant circuit 136 may be used for various electric machines, actuators, or motors 142 used for the black start of the primary power plant 11.

The plant circuit 136 may be coupled to and provide power through a plurality of additional lines or circuits 143. These circuits 143 include an auxiliary power circuit 144 having a transformer 146 (e.g., two winding transformer), which is configured to provide a suitable power for operating various auxiliary equipment of the primary power plant 11. The circuits 143 further include a generator startup circuit 148 having a transformer 150 (e.g., three winding transformer), a load commutated inverter (LCI) 152, and a switch 154 configured to provide suitable power for starting the generator 22. For example, the transformer 150 (or LCI transformer) is configured to provide the correct voltage to the LCI 152 (or static startup device), and the LCI 152 is configured to provide the correct voltage and current to the generator 122 for the startup.

The circuits 143 further include a generator excitation circuit 156 having a transformer 158 (e.g., two winding transformer or excitation transformer) and an excitation device 160 for generating an electric field in the generator 22. For example, the transformer 158 is configured to convert the voltage level for the supply of the excitation, and the excitation device 160 is configured to provide current to a rotor of the generator 22 to produce the electric field in the generator 22. The circuits 143 are further coupled to a generator step-up transformer 162 configured to connect the generator 22 to the power grid 13, e.g., 400 kV.

In the illustrated embodiment, the black start system 120 has both the energy storage system 64 and the auxiliary power generation system 66 coupled to the supply circuit 130. However, the black start system 120 may be configured differently with the energy storage system 64 and the auxiliary power generation system 66 coupled to the primary power plant 11 in different locations relative to the circuits 143.

Figure 4:
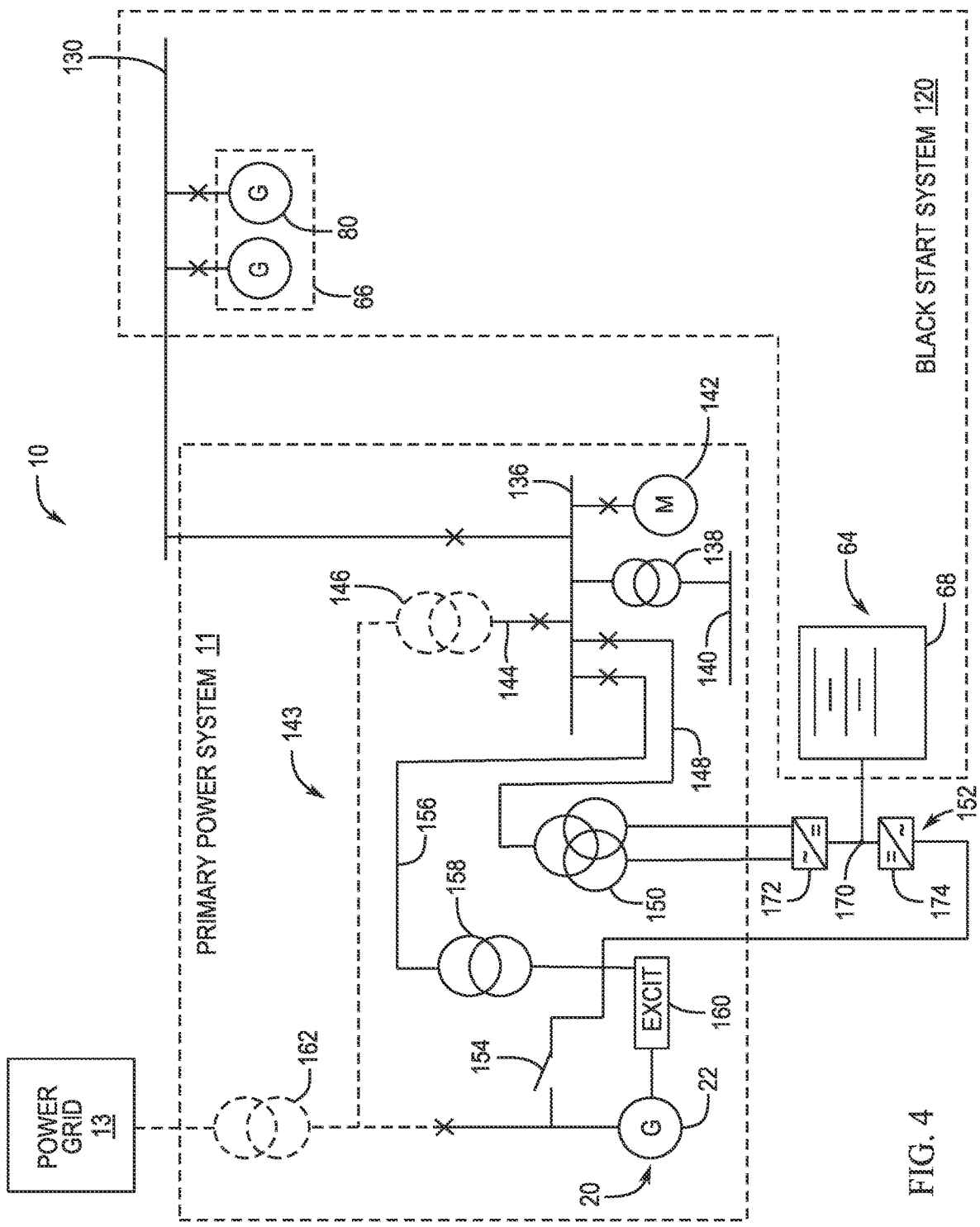
FIG. 4 is a schematic of an embodiment of the hybrid power plant of FIG. 1, illustrating details of a black start system using a combination of power from both the energy storage system and the auxiliary power generation system.

FIG. 4 is a schematic of an embodiment of the hybrid power plant 10 of FIG. 1, illustrating details of the black start system 120 using a combination of power from both the energy storage system 64 and the auxiliary power generation system 66 for black starting the primary power plant 11. The embodiment of FIG. 4 is substantially the same as the embodiment of FIG. 3, except for the configuration of the energy storage system 64. In contrast to the embodiment of FIG. 3, the energy storage system 64 is coupled to the plant circuits 143 (particularly the circuit 148) rather than the supply circuit 130.

As illustrated, the energy storage unit 68 (e.g., battery) of the energy storage system 64 is coupled to the circuit 148 at a connection point 170 between the transformer 150 and the switch 154, and the circuit 148 includes a rectifier 172 and an inverter 174 disposed about the connection point 170. The rectifier 172 is configured to convert AC to DC (or DC to AC on a first side of the connection point 170), and the inverter 174 is configured to convert DC to AC on a second side of the connection point 170. In certain embodiments, the LCI 152 may include the rectifier 172 and the inverter 174.

In the illustrated embodiment, the black start system 120 can eliminate an extra converter for the energy storage unit 68 (e.g., battery), and the rectifier 172 may be used to load the energy storage unit 68 (e.g., battery). The LCI 152 may be a relatively large consumer of power during the black start, so the illustrated embodiment is beneficial in that it places the boosting energy from the energy storage unit 68 in close proximity to the LCI 152 (i.e., high power demand location). Additionally, if the boosting energy provided by the energy storage unit 68 (e.g., battery) is not sufficient, then the rectifier 172 can still provide some additional power. In the illustrated embodiment, the rectifier 172 is configured to convert power in both directions (i.e., AC to DC and DC to AC), such that the energy storage unit 68 (e.g., battery) also can provide power for other services during the black start (i.e., not only the startup of the generator 22). Accordingly, relative to FIG. 3, the embodiment of FIG. 4 provides additional advantages in the black start system 120.

In certain embodiments, the black start system 120 may include one or more energy storage units 68 of the energy storage system 64 disposed in the location of FIG. 3 and also in the location of FIG. 4. Furthermore, the black start system 120 may include one or more energy storage units 68 of the energy storage system 64 disposed at a plurality of locations throughout the primary power plant 11, e.g., at multiple locations in the plant circuits 143.

Figure 5:
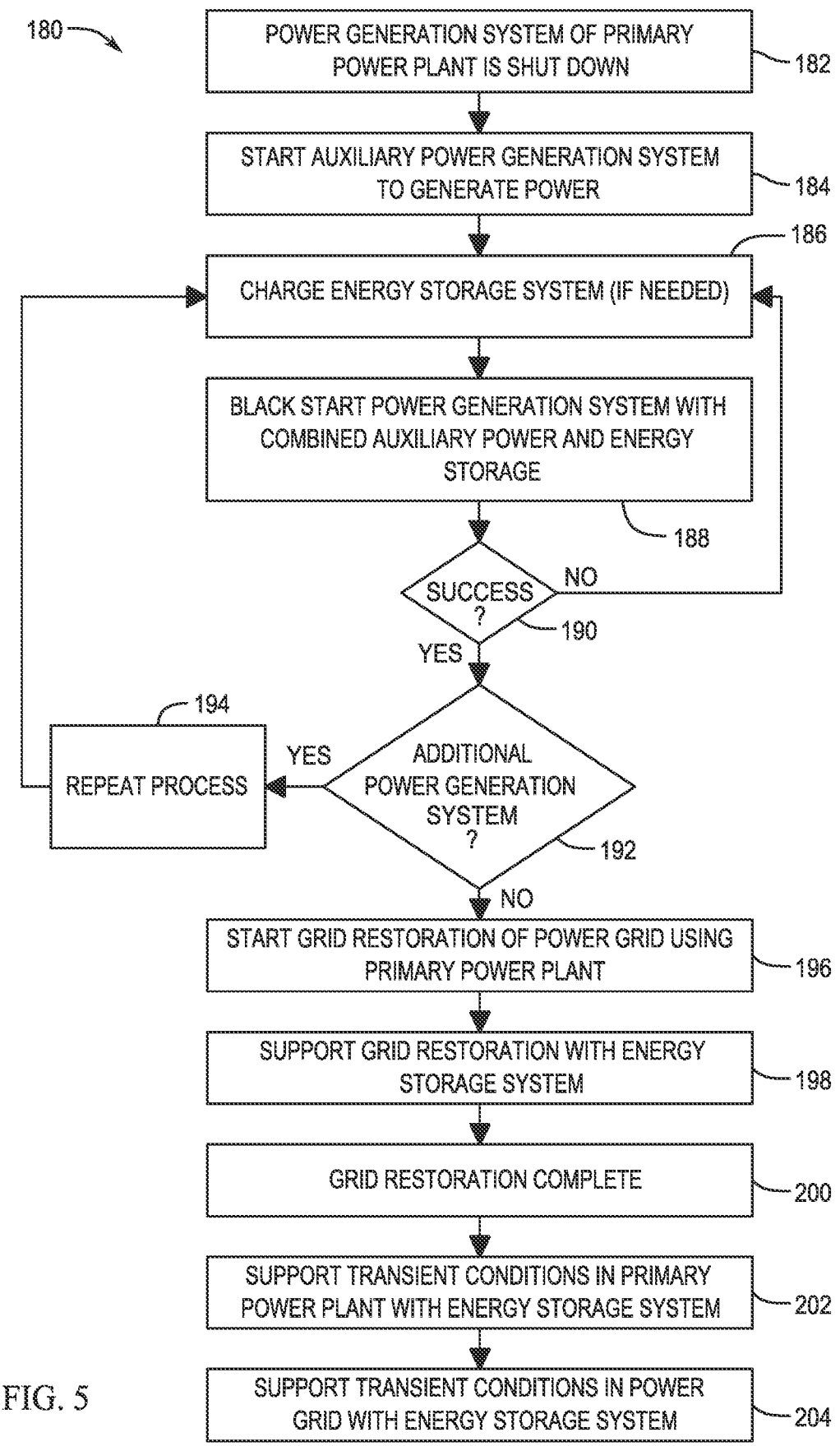
FIG. 5 is an embodiment of a power restoration process for a primary power plant coupled to a power grid.

FIG. 5 is an embodiment of a power restoration process 180 for a primary power plant 11 coupled to a power grid 13. In the illustrated embodiment, the process 180 begins at block 182 when a power generation system 20 (e.g., gas turbine generator system 26) of the primary power plant 11 is shut down, e.g., due to a black out. At block 184, the process 180 starts an auxiliary power generation system 66 (e.g., one or more auxiliary power generation units 80 such as diesel engine driven generators) to generate power for the primary power plant 11. At block 186, the process 180 charges an energy storage system 64 (e.g., one or more energy storage units 68 such as batteries) if additional charging is needed to support a black start. After the energy storage system 64 is sufficiently charged at block 186, the process 180 proceeds to block 188 to initiate a black start of the power generation system 20 of the primary power plant 11 using a combination of power from both the auxiliary power generation system 66 and the energy storage system 64.

The process 180 then evaluates whether or not the black start was successful at block 190. If the black start was not successful, then the process 180 returns to block 186 for charging of the energy storage system 64. If the black start was successful, then the process 180 proceeds to a query block 192 to evaluate whether or not additional power generation systems 20 (e.g., gas turbine generator systems 26) of the primary power plant 11 also need a black start. If additional power generation systems 20 need a black start, then the process 192 triggers a repeat of the process at block 194 and returns to block 186 for recharging of the energy storage system 64. Alternatively or additionally, the started power generation system 20 may be used to start the additional power generation systems 20.

If a black start is not required for additional power generation systems 20, then the process 180 proceeds to block 196 to start grid restoration of the power grid 13 using the primary power plant 11. The process 180 also may support the black grid restoration of the power grid 13 using power from the energy storage system 64, as indicated by block 198. The black grid restoration using the energy storage system 64 is discussed in further detail below. The process 180 continues to restore the power grid 13 until the grid restoration is complete, as indicated by block 200. During normal operation, the process 180 also may be configured to provide support to handle transient conditions in the primary power plant 11 using power from the energy storage system 64, as indicated by block 202. Finally, the process 180 may be configured to provide support to handle transient conditions in the power grid 13 using power from the energy storage system 64, as indicated by block 204.

Figure 6:
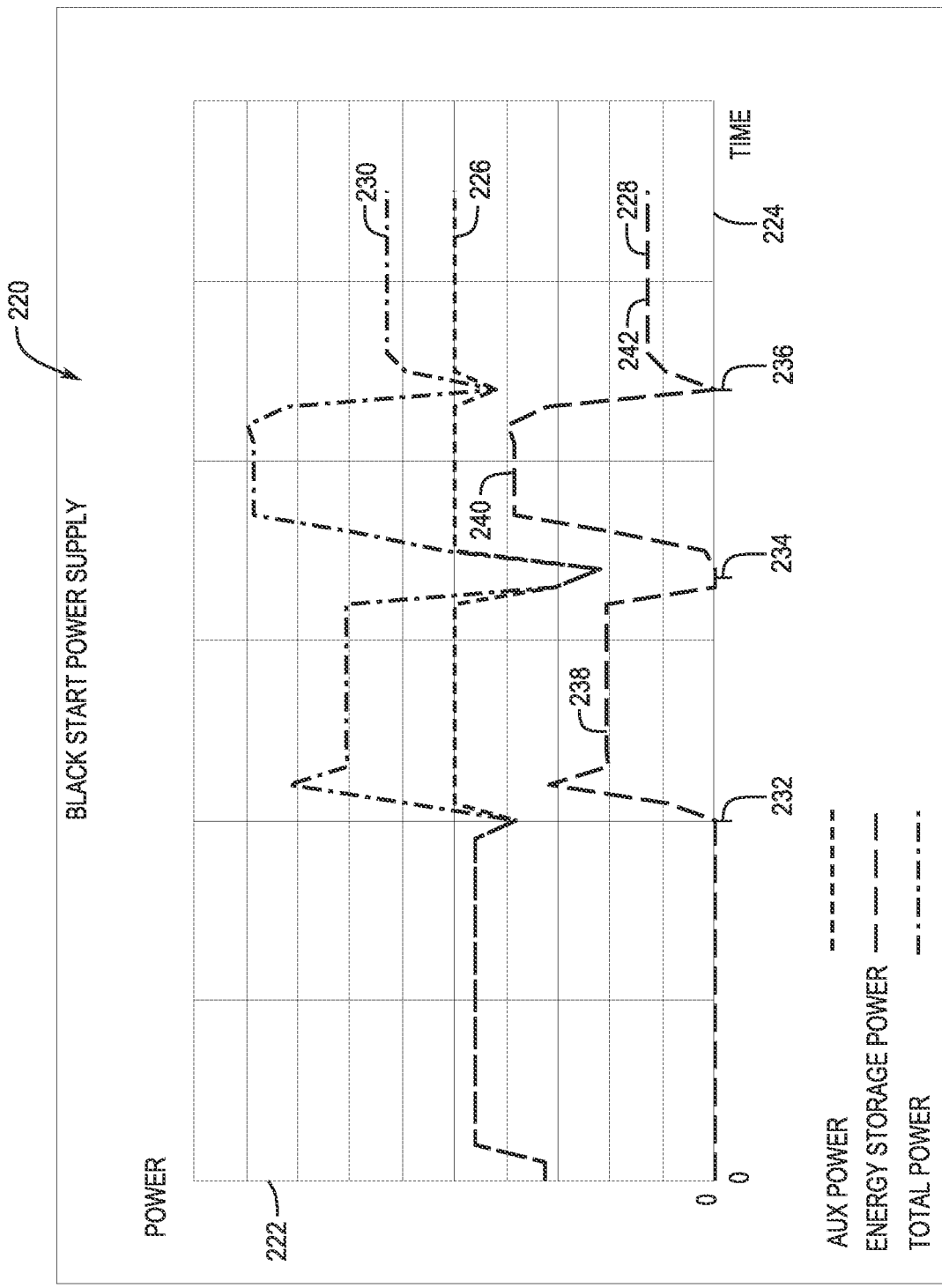
FIG. 6 is a graph of power versus time of an embodiment of a black start power supply using the energy storage system and the auxiliary power generation system of FIGS. 1-5.

FIG. 6 is a graph 220 of power 222 versus time 224 of an embodiment of a black start power supply using the energy storage system 64 and the auxiliary power generation system 66 to black start one of the power generation systems 20 (e.g., gas turbine generator systems 26) of the primary power plant 11. As illustrated, the dashed line 226 represents the auxiliary power provided by the auxiliary power generation system 66 for the black start, the dashed line 228 represents the energy storage power provided by the energy storage system 64 for the black start, and the dashed line 230 represents the combined power provided by both systems 64 and 66 for the black start.

In the illustrated embodiments, as discussed above, the dashed line 226 representing the auxiliary power may be considered a baseline power for the black start. The black start system 120 may be configured to use the baseline power (i.e., dashed line 226) until black start demand exceeds the capacity of the auxiliary power generation system 66. For example, the graph illustrates several spikes in the black start power demand, which start at times 232, 234, and 236. Immediately prior to these times 232, 234, and 236, the power supplied by the energy storage system 64 may be approximately zero or substantially less than the power provided by the auxiliary power generation system 66. For example, immediately prior to times 232, 234, and 236, the power supplied by the energy storage system 64 may be less than or equal to 0, 1, 2, 3, 4, 5, 6, 7, 8, 9, 10, 15, or 20 percent of the power supplied by the auxiliary power generation system 66.

As further illustrated, at times 232, 234, and 236, the energy storage system 64 provides boosts in power supply 238, 240, and 242, respectively, sufficient to meet the increased demand. In other words, in the illustrated embodiment, the auxiliary power generation system 66 provides a primary source of power for the black start until the black start power demand exceeds the capacity of the auxiliary power generation units 80, and then the energy storage system 64 covers any excess power demand beyond the capacity of the auxiliary power generation units 80. In some embodiments, the black start system 120 may be configured to use power from both the energy storage system 64 and the auxiliary power generation system 66 in one or more additional ways, not limited to the technique illustrated by FIG. 6.

Figure 7:
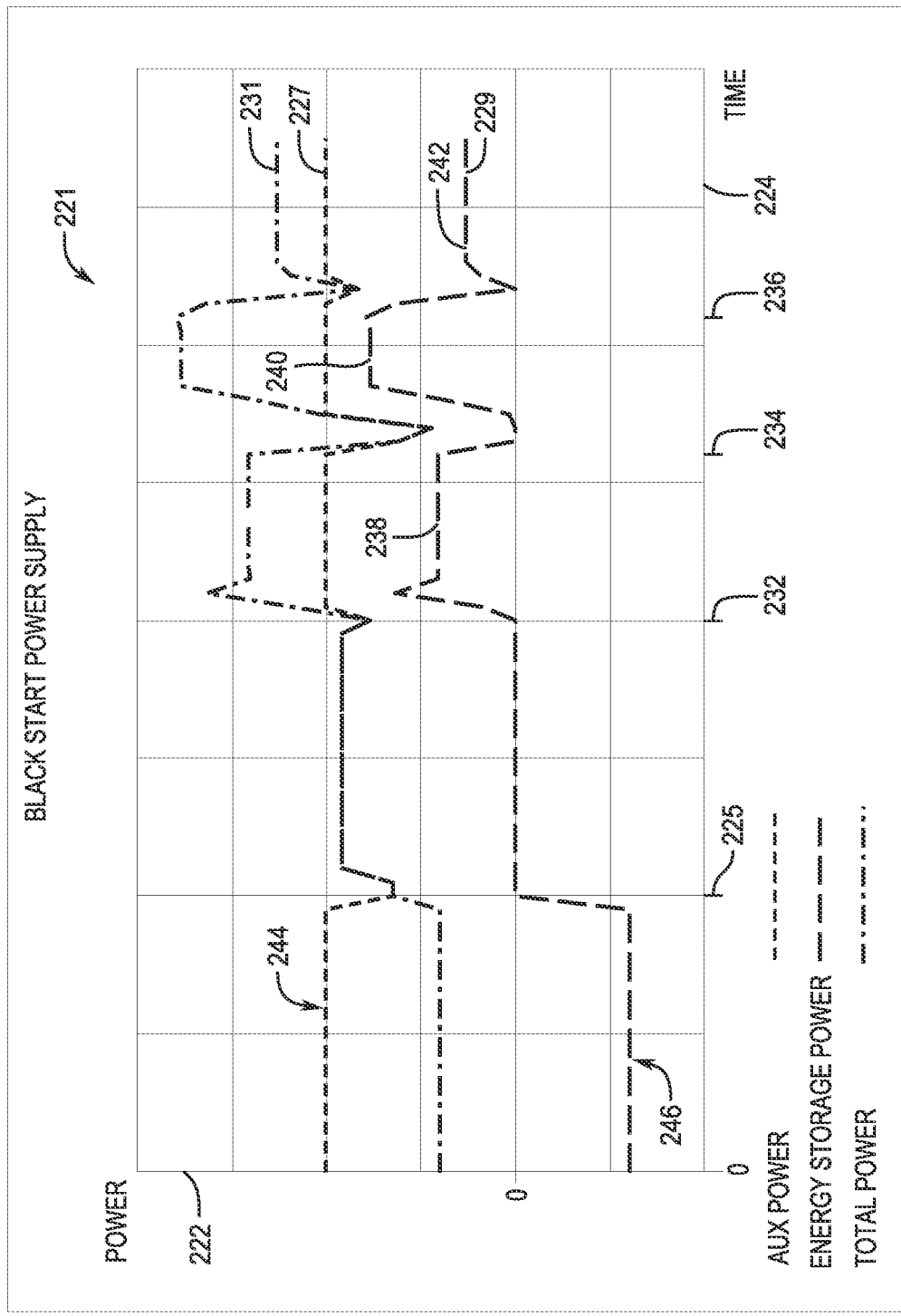
FIG. 7 is a graph of power versus time of an embodiment of the black start power supply of FIG. 6, further illustrating a preliminary charge (or recharge) process using the auxiliary power generation system to charge the energy storage system.

FIG. 7 is a graph 221 of power 222 versus time 224 of an embodiment of a black start power supply using the energy storage system 64 and the auxiliary power generation system 66 to black start one of the power generation systems 20 (e.g., gas turbine generator systems 26) of the primary power plant 11 after a preliminary charge (or recharge). As illustrated, the dashed line 227 represents the auxiliary power provided by the auxiliary power generation system 66 for the black start, the dashed line 229 represents the energy storage power provided by the energy storage system 64 for the black start, and the dashed line 231 represents the combined power provided by both systems 64 and 66 for the black start. The graph 221 differs from the graph 220 of FIG. 6 only for the preliminary duration of time between time 0 and time 225, which may be referred to as a charge (or recharge) time. At time 225, the graph 221 depicts substantially the same power versus time trends in the auxiliary power 227, the energy storage power 229, and the total power 231.

During the charge time, the auxiliary power 227 is increased as indicated by a power boost 244 to help charge the energy storage units 68, which receive (or draw) power from the auxiliary power generation system 66. Accordingly, the graph 221 illustrates a negative value for the energy storage power 229 between times 0 and 225, indicating a charge mode 246 for the energy storage system 64. Upon fully charging the energy storage units 68 at time 225, the energy storage power 229 returns to zero, indicating that the energy storage units 38 are ready and waiting to supply power for the black start process when needed. As discussed above with reference to FIG. 6, at times 232, 234, and 236, the energy storage system 64 provides boosts in power supply 238, 240, and 242, respectively, sufficient to meet the increased demand. In other words, in the illustrated embodiment, the auxiliary power generation system 66 provides a primary source of power for the black start until the black start power demand exceeds the capacity of the auxiliary power generation units 80, and then the energy storage system 64 covers any excess power demand beyond the capacity of the auxiliary power generation units 80.

After the black start is complete, the primary power plant 11 may be configured to begin restoration of the power grid 13. The following discussion focuses on restoration of the power grid 13, and the disclosed embodiments of FIGS. 7-11 may be used alone or in combination with the embodiments of FIGS. 1-7.

Figure 8:
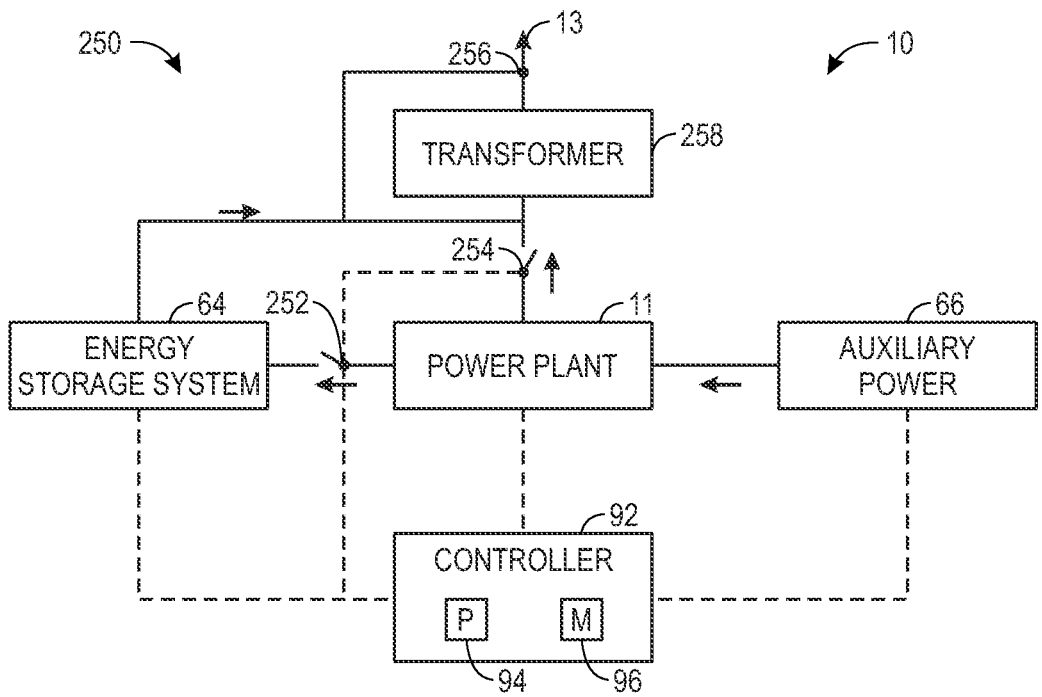
FIGS. 8 and 9 are schematics of embodiments of a power grid restoration system that includes a hybrid power plant that restores power to a black grid.

FIG. 8 is a schematic of an embodiment of a power grid restoration system 250 that includes a hybrid power plant 10 that restores power to a black grid. The hybrid power plant 10 includes a power plant 11 that couples to an energy storage system 54. As discussed above, the energy storage system 64 (e.g., battery energy storage system, or BESS) may include batteries that receive and store electrical energy produced by the power plant 11 as chemical energy. As explained above, during black grid restoration, the power plant 11 may not receive power from the power grid 13 during startup. More specifically, the power plant 11 may not receive power through the transmission lines that couple the power plant 11 to the power grid 13. Instead, the hybrid power plant 10 may include the auxiliary power generation system 66 (e.g., auxiliary power source) that provides power to the house loads of the power plant 11 during start-up. The power plant 11 uses power from the auxiliary power generation system 66 to power equipment of the power plant 11 that is required for start-up and operation of the power plant 11 until the power plant 11 produces enough power to power its house loads (e.g., pumps, valves, control systems) or even until end of the power grid restoration. Once the power plant 11 is operational, the hybrid power plant 10 can start restoring power to the black grid in steps (i.e., by restoring sections of the power grid, in turn).

In order to control the process of black grid restoration, the hybrid power plant 10 includes the controller 92 having the processor 94 and the memory 96. For example, the processor 94 may be a microprocessor that executes software to control operation of the power plant 11, the energy storage system 64, and the auxiliary power generation system 66. The processor 94 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 94 may include one or more reduced instruction set (RISC) processors.

The memory 96 may include a volatile memory, such as random access memory (RAM), and/or a nonvolatile memory, such as read-only memory (ROM). The memory 96 may store a variety of information and may be used for various purposes. For example, the memory 96 may store processor executable instructions, such as firmware or software, for the processor 94 to execute. The memory 96 may include ROM, flash memory, a hard drive, or any other suitable optical, magnetic, or solid-state storage medium, or a combination thereof. The memory 96 may store data, instructions, and any other suitable data.

After starting the power plant 11, the controller 92 ramps up power production by the power plant 11, if needed to charge the energy storage system 64. It should be understood that the discussion of opening and closing switches is to facilitate an understanding of the flow of power and not necessarily how the flow of power may actually be controlled. In order to charge the energy storage system 64, a switch 252 is closed to enable power to flow from the power plant 11 and/or the auxiliary power generation system 66 to the energy storage system 64. After charging the energy storage system 64, in certain embodiments, the controller 92 may open the switch 252 while closing the switch 254. Closing the switch 254 enables the release of power from the power plant 11 to the power grid 13. While closing the switch 254, the controller 92 simultaneously releases power from the energy storage system 64 to the power grid 13. The combined release of power from the energy storage system 64 and the power plant 11 is a first block load (e.g., block of power).

For example, the power plant 11 may release 20 MW and the energy storage system 64 may release 25 MW of power for a combined power output of 45 MW. The 45 MW reenergizes a section of the power grid 13 (e.g., section 14, 16, 18 in FIG. 1). The controller 92 then reduces power output by the energy storage system 64, while simultaneously increasing power output by the power plant 11.

Continuing with the example above, the controller 92 reduces power output of the energy storage system 64 from 25 MW to 0 MW while simultaneously increasing power production by the power plant 11 from 20 MW to 45 MW. In this way, the power plant 11 may gradually increase power production while reducing and/or blocking the dynamic loading (e.g., rapid increases in power production) of the power plant 11. It should be understood that the power output by the energy storage system 64 and/or the power plant 11 may be greater than or less than the exemplary power outputs described, depending on the capacity/sizing of hybrid power plant 10 and power demand of the power grid 13.

After matching the first block of power or load, the controller 92 again releases power from the energy storage system 64. The second block of power may include 45 MW from the power plant 11 and 25 MW from the energy storage system 64 for a combined power release of 70 MW. The release of this second block of power reenergizes a second section of the power grid 13, in addition to maintaining power to the first section. The controller 92 then reduces power output by the energy storage system 64 while simultaneously increasing power output by the power plant 11. That is, power production by the energy storage system 64 is reduced from 25 MW to 0 MW while simultaneously increasing power production by the power plant from 45 MW to 70 MW. In this way, the controller 92 may continue to release block loads of power from the hybrid power plant 10 to the power grid 13 to restore power to additional grid sections (e.g., 1, 2, 3, 4, 5, 10, or more sections).

In some embodiments, the block load of power may also include a power jump provided by the power plant 11 that is in addition to the power jump provided by the energy storage system 64. For example, the power plant may release a first block load of power with 20 MW from the power plant 11 and 25 MW from the energy storage system 64 for a combine power output of 45 MW. The 45 MW reenergizes a section(s) of the power grid 13 (e.g., section 14, 16, 18 in FIG. 1). The controller 92 then reduces power output by the energy storage system 64 while simultaneously increasing power output by the power plant 11.

After matching the first block of power or load (i.e., 45 MW), the controller 92 again releases power from the energy storage system 64 while also providing an additional power jump from the power plant 11. For example, the energy storage system 64 again releases 25 MW of power, while the power plant 11 releases 60 MW (i.e., 45 MW equaling the first block load, plus a 15-MW power jump). Thus, the second block of power delivers a combined 85 MW to the power grid 13. The release of this second block of power reenergizes one or more additional sections of the power grid in addition to maintaining power to the first section.

The controller 92 then reduces power output by the energy storage system 64 while simultaneously increasing power output by the power plant 11. That is, power production by the energy storage system 64 is reduced from 25 MW to 0 MW, while simultaneously increasing power production by the power plant 11 from 60 MW to 85 MW. In this way, the controller 92 may continue to release block loads of power from the hybrid power plant 10 to the power grid 13 to restore power to additional grid sections (e.g., 1, 2, 3, 4, 5, 10, or more sections).

As the hybrid power plant 10 block loads the power grid 13, the release of power from the energy storage system 64 may exhaust the batteries of the energy storage system 64. Accordingly, between each release of power by the energy storage system 64 or after multiple releases, the controller 92 may close the switch 252 and increase power production by the power plant 11 to recharge the batteries of the energy storage system 64. After recharging the energy storage system 64, the process of releasing block loads of power may continue.

As illustrated, the power plant 11 and the energy storage system 64 are behind/upstream from the same point of interconnect 256 to the power grid 13. By placing the power plant 11 and the energy storage system 64 behind/upstream from the same point of interconnect 256, the power released by the power plant 11 and the energy storage system 64 flow through the same transformer 258 (e.g., set of transformers). In other words, the hybrid power plant 10 may not include duplicate components (e.g., transformers) for the power plant 11 and for the energy storage system 64. In some embodiments, power from the energy storage system 64 may not flow through transformer 258, but rather the energy storage system 64 may connect to the high-side of the transformer 258, where it then flows through the point of intersect 70.

Figure 9:
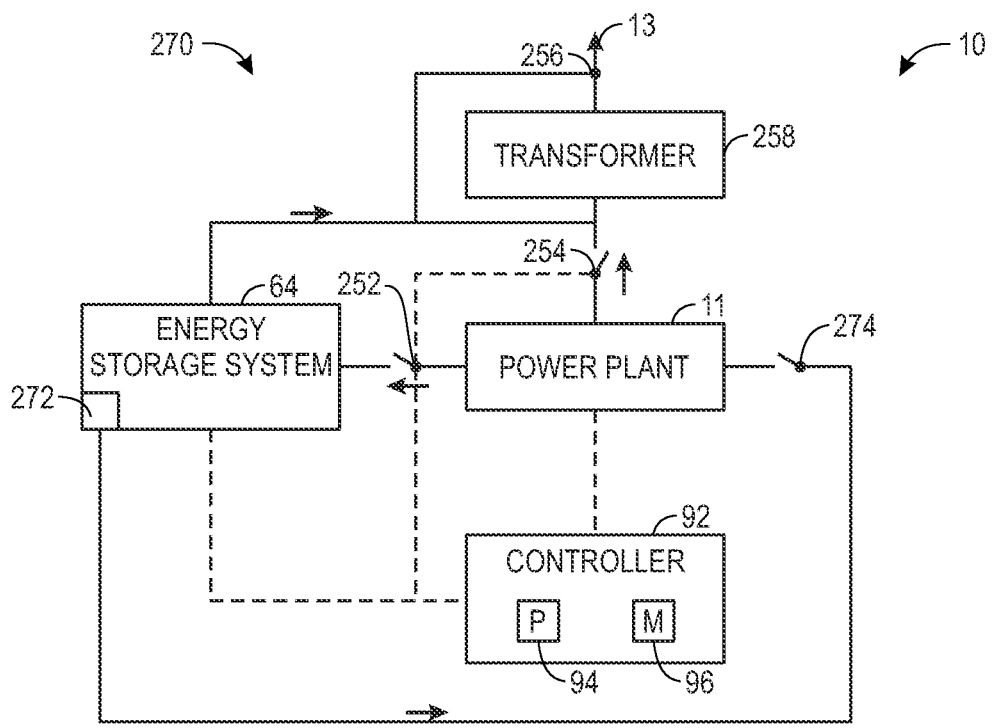

FIG. 9 is a schematic of an embodiment of a power grid restoration system 270 that includes a hybrid power plant 10 that restores power to a black grid. The hybrid power plant 10 includes a power plant 11 that couples to an energy storage system 64. The energy storage system 64 may include batteries that receive and store electrical energy produced by the energy plant 92 as chemical energy. As explained above, during black grid restoration the power plant 11 may not receive power from the power grid 13 during startup. The hybrid power plant 10 therefore uses a different source of power during startup. In FIG. 9, the hybrid power plant 10 uses the energy storage system 64 to provide power to the house loads of the power plant 11 during start-up.

During normal operation of the hybrid power plant 10, the power plant 11 charges the energy storage system 64. The energy storage system 64 or a portion thereof may therefore contain sufficient power to start the equipment of the power plant 11 required for operation and start-up until the power plant 11 provides sufficient power to power itself. In some embodiments, a portion 272 of the energy storage system 64 (e.g., one or more energy storage units 68) may be dedicated to the restart of the power plant 11 or supply of house loads. The charge in this portion 272 (e.g., energy storage units 68) may be continuously maintained during operation of the hybrid power plant 10 in order to restart the power plant 11 in the event of a black grid restoration or black start. In still other embodiments, different portions (e.g., energy storage units 68) of the energy storage system 64 may alternate as the dedicated portion 272 for storing power for restarting the power plant 11 and respective house loads. Alternating the portion of the energy storage system 64 dedicated to restarting the power plant 11 may enable equal wear of the energy storage units 68 (e.g., batteries) in the energy storage system 64.

During black grid restoration, the controller 92 closes a switch 274 and releases power from the energy storage system 64 (e.g., portion 272) to the power plant 11. The power plant 11 uses this energy to start various pieces of equipment required for start-up and operation of the power plant. The power plant 11 continues to use this power until the power plant 11 produces enough power to power itself or until grid restoration.

The controller 92 includes the processor 94 and the memory 96. The memory 96 may store a variety of information and may be used for various purposes. For example, the memory 96 may store processor executable instructions, such as firmware or software, for the processor 94 to execute for controlling the hybrid power plant 10 (e.g., during black grid restoration).

As explained above, after starting the power plant 11, the controller 92 ramps up power production by the power plant 11 and closes the switch 252 in order to charge the energy storage system 64. After charging the energy storage system 64, the controller 92 may open the switch 252 while closing the switch 254. Closing the switch 254 enables the release of power from the power plant 11 to the power grid 13. While closing the switch 254, the controller 92 simultaneously releases power from the energy storage system 64 to the power grid 13 as a combined first block of power or load. The controller 92 then reduces power output by the energy storage system 64 while simultaneously increasing power output by the power plant 11 to compensate for the change in power output by the energy storage system 64. As explained above, it should be understood that the discussion of opening and closing switches is to facilitate an understanding of the flow of power and not necessarily how the flow of power may actually be controlled.

After matching the first block of power, the controller 92 again releases power from the energy storage system 64. The release of this second block of power reenergizes a second section of the power grid while the power plant 11 maintains power to the first section. The controller 92 then again reduces power output by the energy storage system 64 while simultaneously increasing power output by the power plant 11. In this way, the controller 92 may continue to release block loads of power from the hybrid power plant 10 to the power grid 13 to restore power to additional grid sections (e.g., 1, 2, 3, 4, 5, 10, or more sections).

As the hybrid power plant 10 block loads the power grid 13, the release of power from the energy storage system 64 may exhaust the energy storage units 68 (e.g., batteries) of the energy storage system 64. Accordingly, between each block load of the power grid 13 or after multiple block loadings, the controller 92 may close the switch 252 and increase power production by the power plant 11 to recharge the energy storage units 68 of the energy storage system 64. After recharging the energy storage system 64, the process of releasing block loads of power may continue. As the block loads of power are released, they flow through the transformer 258 and through the same point of intersect 256 with the power grid 13. In some embodiments, power from the energy storage system 64 may not flow through transformer 258, but rather the energy storage system 64 may connect to the high-side of the transformer 258 from which the power flows through the point of intersect 256.

Figure 10:
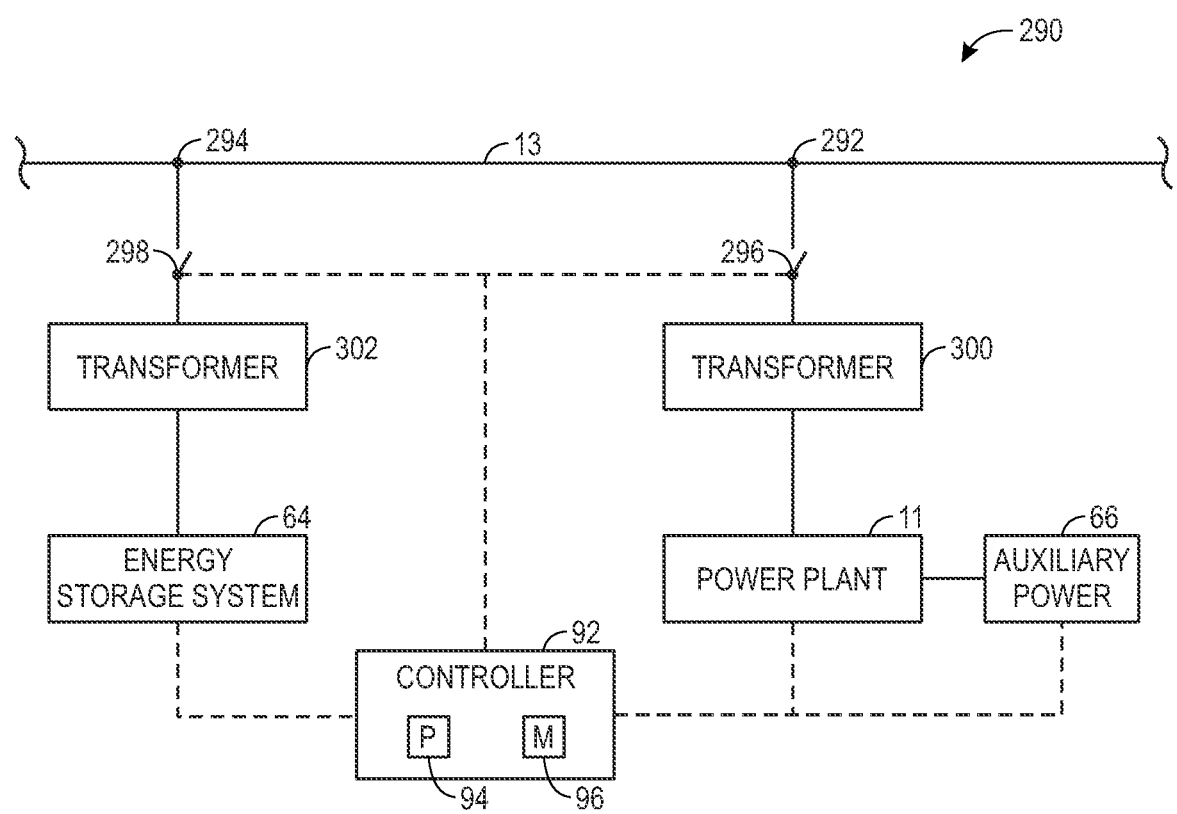
FIG. 10 is a schematic of an embodiment of a power grid restoration system that includes a power plant and an energy storage system that work together to restore power to a black grid.

FIG. 10 is a schematic of an embodiment of a power grid restoration system 290 that includes a power plant 11 and an energy storage system 64 that work together to restore power to a black grid. As illustrated, the power plant 11 and the energy storage system 64 may have different points of intersection with the power grid 13 (e.g., points of intersection 292 and 294, respectively) and may not be co-located. The power plant 11 and the energy storage system 64 may be separate systems coupled to the power grid 13, and whose operation is coordinated by a controller 92 to restore power to a black grid.

As explained above, during black grid restoration, a power plant 11 may not receive power from the power grid 13 during start-up. The power plant 11 may instead use an auxiliary power source (e.g., energy storage system 64 and/or auxiliary power generation system 66) to power the equipment of the power plant required for start-up and operation of power plant 11 until the power plant 11 provides sufficient power to power itself or even until end of the power grid restoration if deemed to be required.

The controller 92 may control power production by the auxiliary power generation system 66, as well as the start-up of the power plant 11. The controller 92 includes the processor 94 and the memory 96. The memory 96 may store a variety of information and may be used for various purposes. For example, the memory 96 may store processor executable instructions, such as firmware or software, for the processor 94 to execute for controlling the power plant 11, the auxiliary power generation system 66, as well as the energy storage system 64 (e.g., during black grid restoration).

As explained above, after starting the power plant 11, the controller 92 ramps up power production by the power plant 11. After ramping up power production, the controller 92 releases power from the power plant 11 to the power grid 13. Simultaneous with the release of power from the power plant 11 via closed switch 296, the controller 92 closes the switch 298 to release power from the energy storage system 64. The combined power output from the power plant 11 and from the energy storage system 64 form a first block of power or load that enters the power grid 13. The controller 92 then reduces power output by the energy storage system 64 while simultaneously increasing power output by the power plant 11 to compensate for the change in power output by the energy storage system 64. In this way, the power plant 11 may gradually increase power production while reducing and/or blocking the dynamic loading (e.g., rapid increases in power production) of the power plant 11.

After matching the first block of power, the controller 92 again releases power from the energy storage system 64. The release of this second block of power reenergizes a second section of the power grid while the power plant 11 maintains power to the first section. The controller 92 then again reduces power output by the energy storage system 64 while simultaneously increasing power output by the power plant 11. The controller 92 continues to release block loads of power to the power grid 13 until the additional grid sections are reenergized (e.g., 1, 2, 3, 4, 5, 10, or more sections) and power production is sustained by the power plant 11.

Over time, the release of power from the energy storage system 64 may exhaust the batteries of the energy storage system 64. Accordingly, the power plant 11 may increase power production which then flows through the power grid 13 and recharges the batteries of the energy storage system 64. After recharging the energy storage system 64, the process of releasing block loads of power may continue.

As explained above, the power plant 11 and the energy storage system 64 may not be co-located and may have different points of intersection with the power grid 13 (specifically, points of intersection 292, 294). The power grid restoration system 290 may include multiple transformers in order to increase the voltage of these power sources. As illustrated, the power grid restoration system 290 includes a transformer 300 that increases the voltage of the electricity released by the power plant 11 to the power grid 13. Likewise, the power grid restoration system 290 includes a transformer 302 that increases the voltage of the electricity released by the energy storage system 64.

Figure 11:
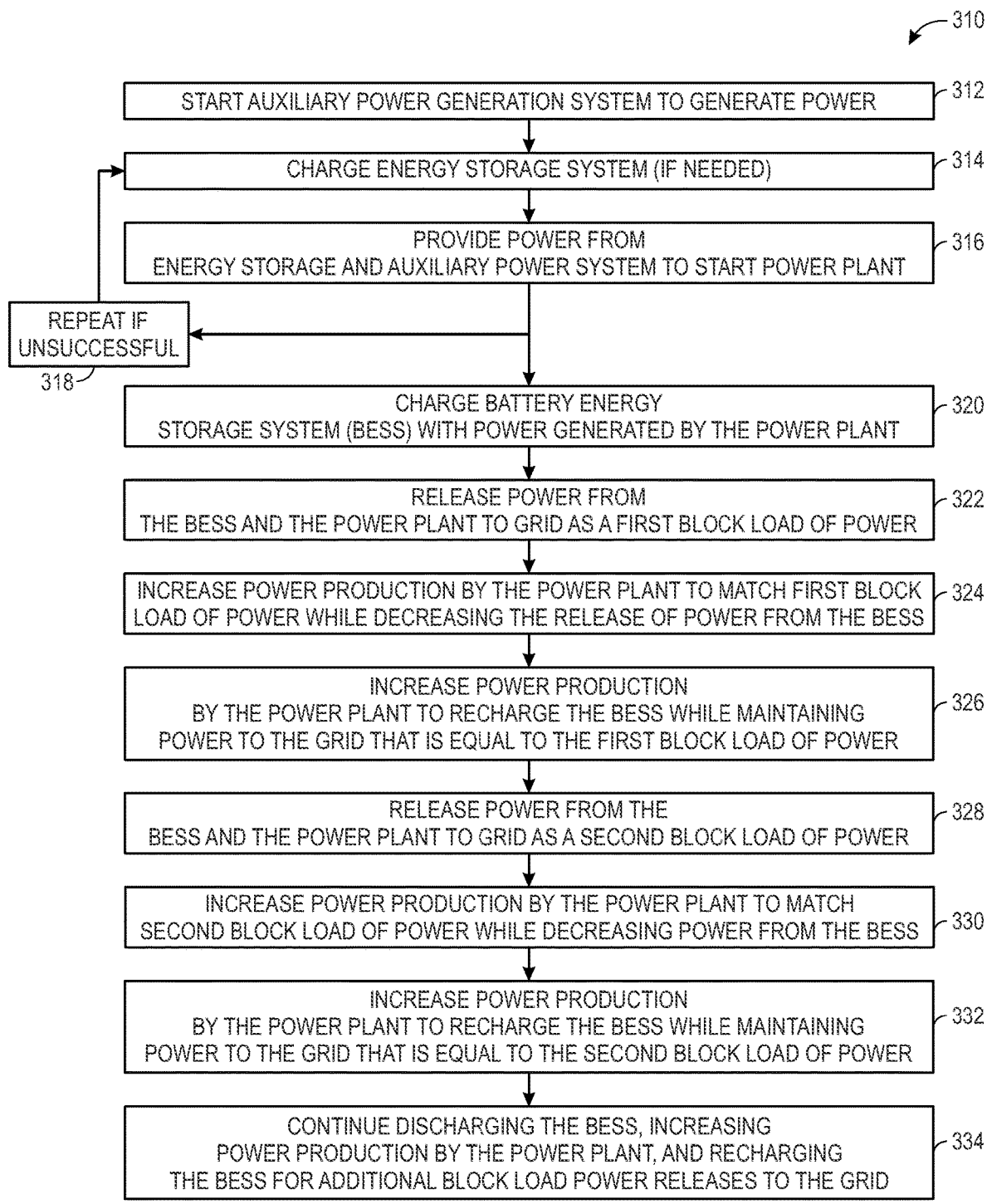
FIG. 11 is an embodiment of a process of restoring power to a black grid.

FIG. 11 is an embodiment of a process 310 of restoring power to a black grid. At block 312, the process 310 starts the auxiliary power generation system 66. At block 314, the process 310 charges the energy storage system 64 if needed. At block 316, the process 310 provides power from the energy storage system 64 and the auxiliary power generation system 66 to black start the power plant 11. That is, the combination of power provided by the energy storage system 64 and the auxiliary power generation system 66 may power the power plant house loads as well as starting one or more power plant turbines and generators. If the black start is unsuccessful, then the process 310 may trigger a repeat 318 and return to block 314 for recharging the energy storage system 64.

In some embodiments, after starting the power plant 11, the power generated by the power plant 11 is used to charge the energy storage system 64 at block 320. For example, the energy storage system 64 may have been previously depleted and may need to be recharged before providing power to the power grid 13. After charging the energy storage system 64, the combined power from the power plant and the energy storage system 64 is released to the power grid as a first block load of power, as indicated by block 322. This first block load of power energizes a portion or section of the power grid 13. Power production by the power plant 11 is then increased to match the first block load while simultaneously decreasing the power output of the energy storage system 64, as indicated by block 324. For example, the first block load may include 15 MW from the power plant and 25 MW from the energy storage system 64 for a combined output of 40 MW. During the transition, power production by the energy storage system 64 decreases to zero as power production by the power plant increases to 40 MW.

Power production by the power plant 11 may then increase above the first block load in order to maintain power to the power grid 13 while simultaneously recharging the energy storage system 64 (e.g., recharge if needed) in preparation for the release of a second block load of power, as indicated by block 326. For example, the power plant output may increase to 50 MW. After charging the energy storage system 64, the power from the energy storage system 64 is released to the power grid 13 and combines with the power from the power plant 11 to form a second block load of power, as indicated by block 328. Power production by the power plant 11 is then increased to match the second block load while simultaneously decreasing the power output of the energy storage system 64, as indicated by block 330. For example, the second block load may include 50 MW from the power plant 11 and 25 MW from the energy storage system 64 for a combined output of 75 MW. During the transition, power production by the energy storage system 64 decreases to zero as power production by the power plant increases to 75 MW.

Power production by the power plant 11 may then increase above the second block load in order to maintain power to the power grid 13 while simultaneously recharging the energy storage system 64 (e.g., recharge if needed) in preparation for the release of another block load of power, as indicated by block 332. For example, the power plant 11 output may increase to 85 MW. This process of releasing block loads of power by charging and discharging the energy storage system 64 while increasing power production by the power plant continues (block 334) until the black grid is restored.

Figure 12:
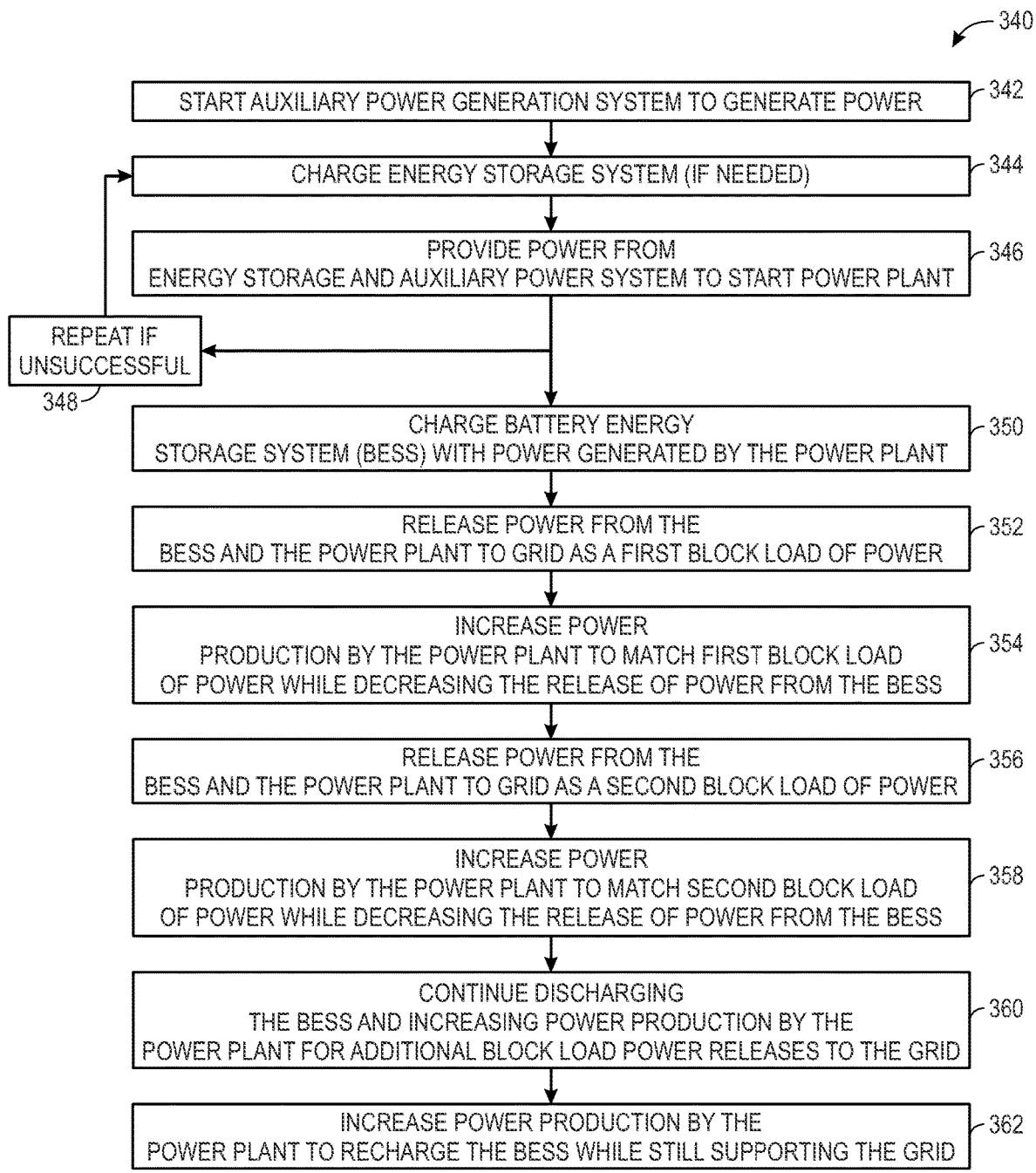
FIG. 12 is an embodiment of a process of restoring power to a black grid.

FIG. 12 is an embodiment of a process 340 of restoring power to a black grid. At block 342, the process 340 starts the auxiliary power generation system 66. At block 344, the process 340 charges the energy storage system 64 if needed. At block 346, the process 340 provides power from the energy storage system 64 and the auxiliary power generation system 66 to black start the power plant 11. That is, the combination of power provided by the energy storage system 64 and the auxiliary power generation system 66 may power the power plant house loads as well as starting one or more power plant turbines and generators. If the black start is unsuccessful, then the process 340 may trigger a repeat 348 and return to block 344 for recharging the energy storage system 64.

In some embodiments, after starting the power plant, the power generated by the power plant is used to charge the energy storage system 64, as indicated by block 350. After charging the energy storage system 64, the combined power from the power plant and the energy storage system 64 is released to the power grid 13 as a first block load of power, as indicated by block 352. This first block load of power energizes a portion or section of the power grid 13. Power production by the power plant 11 is then increased to match the first block load while simultaneously decreasing the power output of the energy storage system 64, as indicated by block 354. For example, the first block load may include 25 MW from the power plant and 25 MW from the energy storage system 64 for a combined output of 50 MW. During the transition, power production by the energy storage system 64 decreases to zero as power production by the power plant 11 increases to 50 MW.

After increasing power production by the power plant 11, power from the energy storage system 64 is again released to the power grid 13 and combines with the power from the power plant 11 to form a second block load of power, as indicated by block 356. Power production by the power plant 11 is then increased to match the second block load while simultaneously decreasing the power output of the energy storage system 64, as indicated by block 358. For example, the second block load may include 50 MW from the power plant 11 and 25 MW from the energy storage system 64 for a combined output of 75 MW. During the transition, power production by the energy storage system 64 decreases to zero as power production by the power plant 11 increases to 75 MW.

The process 340 may continue this process of discharging power from the energy storage system 64 in block loads while increasing power production until the power grid 13 is restored, as indicated by block 360. Over time, the continual discharge of the energy storage system 64 may exhaust the energy stored. The power plant 11 may therefore increase power production to recharge the energy storage system 64 while still supporting power production for the power grid 13, as indicated by block 362.

Technical effects of the present hybrid power plant 10 enable black starting a power plant 11 and a power grid 13 using the secondary power system 12, which includes the energy storage system 64 and the auxiliary power generation system 66. During the black start of the primary power plant 11, the combined power from the energy storage system 64 and the auxiliary power generation system 66 provides advantages of both types of power sources, reduces costs, and improves the black start process. Additionally, when restoring the power grid 13, the energy storage system 64 helps to improve and speed up the grid restoration process. The power grid 13 may therefore be restored more rapidly and without dynamically loading the power plant portion of the hybrid power plant 10, which may reduce stress and lifetime consumption on components of the power plant, such as its gas turbines.

This written description uses examples to disclose systems and methods to black start the power plant and, also, to perform a black grid restoration of the power grid, including the best mode, and also to enable any person skilled in the art to practice the systems and methods, including making and using any devices or systems and performing any incorporated methods. The patentable scope of the technology is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an auxiliary power source configured to black start a power plant, wherein the auxiliary power source comprises:
a first power source comprising an auxiliary generator driven by an auxiliary drive; and
a second power source comprising energy storage, wherein the auxiliary power source is configured to first supply a first power output from the first power source to support the black start of the power plant, and the auxiliary power source is configured to subsequently supply a second power output from the second power source to support the black start of the power plant when a black start power demand exceeds the first power output.

2. The system of claim 1, wherein the auxiliary power source is configured to supply the second power output from the second power source to cover one or more peaks of the black start power demand during the black start of the power plant, wherein the one or more peaks of the black start power demand exceed the first power output.

3. The system of claim 1, wherein the first power output is insufficient to support the black start, the second power output is insufficient to support the black start, and the first and second power outputs are collectively sufficient to support the black start.

4. The system of claim 1, wherein the auxiliary drive comprises a reciprocating engine.

5. The system of claim 1, wherein the energy storage comprises chemical energy storage.

6. The system of claim 5, wherein the chemical energy storage comprises a battery.

7. The system of claim 1, wherein the energy storage comprises thermal energy storage, kinetic energy storage, a pressurized gas storage, or a combination thereof.

8. The system of claim 1, wherein the auxiliary power source is configured to supply power from the first power source to the second power source to charge the energy storage.

9. The system of claim 8, wherein the auxiliary power source is configured to perform the charge prior to the black start, after an unsuccessful attempt at the black start, or a combination thereof.

10. The system of claim 8, wherein the auxiliary power source is configured to perform the charge prior to the black start of a first turbine driven generator of the power plant, prior to the black start of a second turbine driven generator of the power plant, or a combination thereof.

11. The system of claim 1, wherein the auxiliary power source is configured to provide power from the energy storage of the second power source to a power grid when the power plant is restoring power to the power grid.

12. The system of claim 1, wherein the auxiliary power source is configured to provide power from the energy storage of the second power source to help stabilize a frequency of a power grid.

13. The system of claim 1, wherein the auxiliary power source is configured to black start a primary power generation system of the power plant, wherein the primary power generation system comprises one or more primary generators driven by one or more respective primary drives.

14. The system of claim 13, comprising the primary power generation system of the power plant, wherein the one or more primary drives comprise a gas turbine driven by exhaust gas from a combustor.

15. The system of claim 1, wherein the auxiliary drive comprises a reciprocating engine, the energy storage comprises one or more batteries, and the auxiliary power source is configured to supply the second power output only during a portion of the black start when the black start power demand exceeds the first power output.

16. The system of claim 1, comprising a controller configured to control the black start of the power plant using the first and second power outputs from the respective first and second power sources, wherein the controller is configured to control the first power source to provide the first power output as a baseline power for the black start, wherein the controller is configured to control the second power source to provide the second power output as a variable power to help meet transient power requirements for the black start.

17. A system, comprising:
a controller configured to control a black start of a power plant, wherein the controller is configured to first supply a first power output from a first power source of an auxiliary power source to support the black start, wherein the controller is configured to subsequently supply a second power output from a second power source of the auxiliary power source to support the black start when a black start power demand exceeds the first power output, wherein the first power source comprises an auxiliary generator driven by an auxiliary drive and the second power source comprises energy storage.

18. The system of claim 17, wherein the auxiliary power source is configured to supply the second power output from the second power source to cover one or more peaks of the black start power demand during the black start of the power plant, wherein the one or more peaks of the black start power demand exceed the first power output.

19. The system of claim 17, wherein the first power output is insufficient to support the black start, the second power output is insufficient to support the black start, and the first and second power outputs are collectively sufficient to support the black start.

20. A method, comprising:
controlling a black start of a power plant via a controller, wherein controlling the black start comprises first supplying a first power output from a first power source of an auxiliary power source to support the black start, wherein controlling the black start comprises subsequently supplying a second power output from a second power source of the auxiliary power source to support the black start when a black start power demand exceeds the first power output, wherein the first power source comprises an auxiliary generator driven by an auxiliary drive and the second power source comprises energy storage.

\* \* \* \* \*